(12) United States Patent
Parker

(10) Patent No.: US 8,752,451 B2
(45) Date of Patent: Jun. 17, 2014

(54) CAM MECHANISM FOR CONVERTING CONSTANT VELOCITY ROTARY MOTION INTO A CONSTANT VELOCITY RECIPROCATING MOTION

(76) Inventor: Dennis A. Parker, Lakeland, FL (US)

( * ) Notice: Subject to any disclaimer, the term of this patent is extended or adjusted under 35 U.S.C. 154(b) by 445 days.

(21) Appl. No.: 13/084,086

(22) Filed: Apr. 11, 2011

(65) Prior Publication Data
US 2011/0247449 A1    Oct. 13, 2011

Related U.S. Application Data

(60) Provisional application No. 61/323,480, filed on Apr. 13, 2010.

(51) Int. Cl.
*F16H 53/06* (2006.01)
*F16H 53/00* (2006.01)

(52) U.S. Cl.
USPC ............................................. 74/569; 74/567

(58) Field of Classification Search
USPC ................ 74/569, 567, 570.2, 570.21, 570.3
See application file for complete search history.

(56) References Cited

U.S. PATENT DOCUMENTS

| | | | |
|---|---|---|---|
| 1,073,104 A | 9/1913 | Droitcour | |
| 2,224,905 A | 12/1940 | Franz | |
| 2,377,554 A | 6/1945 | Huber | |
| 4,378,221 A * | 3/1983 | Huff et al. | 474/19 |
| 4,733,572 A | 3/1988 | Kobayashi | |
| 5,161,420 A | 11/1992 | Feng | |
| 5,299,516 A | 4/1994 | Sakuma | |
| 5,390,585 A | 2/1995 | Ryuh | |
| 5,546,878 A * | 8/1996 | Sakuma | 112/162 |
| 6,244,229 B1 | 6/2001 | Nakano et al. | |
| 2012/0011997 A1* | 1/2012 | Stephenson et al. | 91/468 |

* cited by examiner

*Primary Examiner* — Richard W Ridley
*Assistant Examiner* — Yamilka Pinero Medina
(74) *Attorney, Agent, or Firm* — Maxey Law Offices PLLC; Stephen Lewellyn

(57) ABSTRACT

A cam mechanism for converting rotary motion into a constant velocity reciprocating motion includes a driven shaft rotatable about an axis of rotation. First and second cam members mounted to the driven shaft for conjoined rotation therewith. A first pair of followers is in contact with the first cam member on opposite sides thereof, and a second pair of followers is in contact with the second cam member on opposite sides thereof. The first pair of followers and the second pair of followers mounted to a follower frame for conjoint motion therewith. The first cam member and the second cam member each have a non-cardioid shape cam profile that results in a constant velocity reciprocation motion of the follower frame upon rotation of the driven shaft about the axis of rotation.

10 Claims, 23 Drawing Sheets

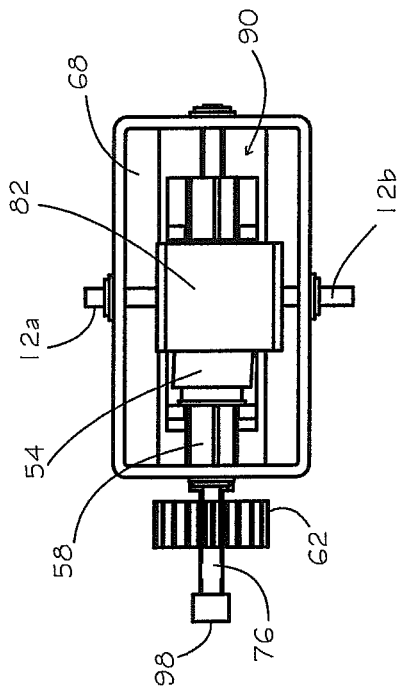
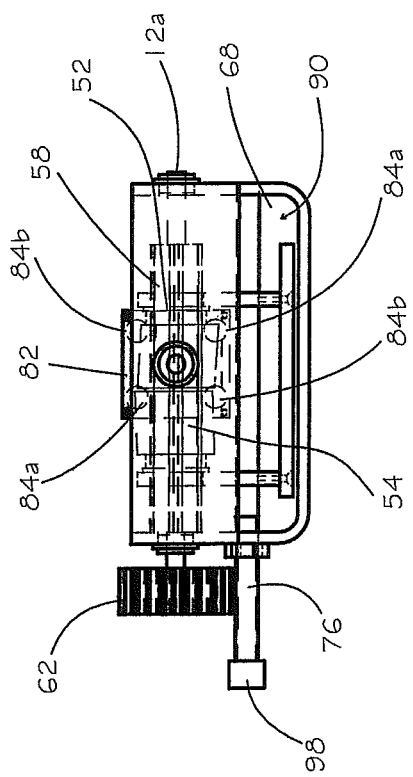

CAM MECHANISM FOR CONVERTING CONSTANT VELOCITY ROTARY MOTION INTO A CONSTANT VELOCITY RECIPROCATING MOTION

CROSS-REFERENCE TO RELATED APPLICATIONS

This application claims the benefit of U.S. Provisional Application No. 61/323,480, filed Apr. 13, 2010, the entire of which is incorporated herein by reference.

FIELD OF THE INVENTION

The present invention relates generally to cam mechanisms for converting rotary motion into linear motion and more particularly, relating to a cam mechanism for converting a constant velocity rotary motion into a constant velocity reciprocating motion.

BACKGROUND OF THE INVENTION

A conjugate "two or pair" cam mechanism is a more practical form of the constant breadth cam mechanism. Conjugate cam mechanisms are designed with two cams on a common shaft. They typically will have two roller followers with one mated tangent to each follower. Typically each roller centers are opposing in a common plane, but there are other designs. That plane will typically intersect the center of the cam shaft, but there are other designs. The two followers are typically rigidly connected to each other to positional encapsulate the two cams. This results in a constant distance between each of the two cam follower rollers. The cam profiles are so designed to cause constant contact with the two rollers. This causes the combined rigid followers to stay in constant contact with the surface profiles of each cam at all moments when the shaft is rotated. This rigid connection of the two followers causes a positive return motion of the followers. That is when one cam is applying displacement it is moving the other follower to its rectilinear direction of displacement "stroke". This rigid connect of the two follower precludes the requirement for an external force such as spring to keep each follower in constant contact with its mating cam surface profile. Two independent followers and cams with springs could cause the same reciprocating motion imparted to each follower, but it would not be true continuous positive motion over the full 360° of its rotation.

Typically each cam will have its mated follower surface profile contact point 180° apart from the other cam. The shaft typically will rotate (0° to 180° imparting the desired reciprocating rectilinear motion to its one follower. It will also positively move the other follower to the same direction in unison. The second cam will begin to impart its reciprocating rectilinear motion to its follower from (180° to 360/0°). This creates continuous positive motion reciprocating motion in opposing directions. This process is repeated as the conjugate cam mechanism is rotated. A limitation for the conjugate cam design is that the two opposing reciprocating stroke motions must be equal in distance. The invention's follower's motion must be in unison to a given direction for given cam angle of rotation, but it does not have to split the direction of reciprocation over any specific division of cam angle rotation as is common to the state of art of a typical conjugate cam mechanism.

A preferred motion relationship of uniform rotary to uniform reciprocating can be useful in a wide range of machine applications. The state of current art conjugate cam mechanisms cannot create this preferred motion relationship practically as herein described. It would also be desirable to be able to change or modulate the stroke length of the reciprocating motion for any given constant speed of rotation. This is not of common art for conjugate cam mechanism. The invention herein describes a practical conjugate cam design that can create the preferred uniform motion and stroke length modulation. The stroke length modulation version has this ability integral within its design. This can be accomplished with constant positive motion or almost constant positive motion depending on the design of the mechanism. These embodiments are unique combination of desirable motion creations that can be done at high speeds and loads by the invention. There are a limited number of solutions of common art that can create uniform motion, such as modified conjugate heart cams, cylinder cams, and multi-link levers. None are practical at higher speeds of operation and load and all have tolerance issues.

Uniform reciprocating motion is a very desirable motion for a wide range of machines, pumps and other types of mechanical equipment. A cam profile that imparts uniform reciprocating motion has a constant rate of rise and return motion applied to its follower. Theoretically the follower would have virtual constant uniform velocity with zero acceleration. When the follower has acceleration it has theoretically has zero velocity. Uniform motion would theoretically have a velocity that goes from zero to its maximum constant velocity in zero time. To accomplish this, the acceleration would have to be theoretically infinite. The typical design of a cam system that creates uniform motion will prevent infinite acceleration; the values for the acceleration will remain high. The jerk will also theoretically approach infinity. The uniform motion will cause a condition of high acceleration and jerk resulting in a large amount of shock. Uniform motion is therefore seldom if ever used in a cam design if there are significant speed and load requirements. They are typically designed for indexing applications in various types of machines, such as textile machines, winding machines and some pumps.

The common art for creating theoretical uniform reciprocating motion requires a cam profile that visually looks like a heart; it is commonly termed a "heart shaped cam". The heart shape cam of proper design can virtually convert uniform rotary motion into prescribed theoretical uniform reciprocating motion applied to its cam follower. Heart shaped cams are defined by a sharp reentrant angle and a sharp salient angle each having defined apex points. These defined points are at opposite and equal ends of the cam profile. They will define two equal congruent lengths of the heart shaped cam profile. The two angles will divide the cam profile 180°/180° of cam angle of rotation. Each apex of the two angles will define the point of directional reversal applied to the follower. These two angles define the moment of change in rise to return for the cam follower. These two angles present abrupt motion changes inherent in heart cams. The result is high acceleration and jerk values, which adversely affect follower and linkage life. It will operate with an adverse non-smooth response.

Practical problems are created by both angles of a heart shaped cam. The reentrant angle can have a cam roller radius that cannot keep in constant contact with the cam profile at the reentrant angle. The term of common art is called an undercut region of the reentrant angle portion of the concave cam profile. When this happens the follower roller will have a positional moment with at least two tangents to the cam profile. There is typically no practical size cam follower roller that can sufficiently maintain a continuous single tangent to the heart shaped cam profile across the reentrant cam angle.

This is typically solved by designing the cam with wider a reentrant cam angle to allow constant single moment of tangent between the cam profile and its mated follower roller. This will require a modified portion of the heart cams profile that will not prescribe uniform reciprocating motion onto the follower. This eliminates the problem of continuous single tangential relationship to the cam profile through the reentrant angle, but it negates continuous uniform motion on that portion of the cam profile. The roller follower also has an undesirable abrupt angle change at the reentrant angle that lessens a smooth response of motion being applied to the roller follower.

The salient angle and its apex causes a different problem of non-smooth response and it is typically solved by blunting the apex point of the salient angle. This of course eliminates uniform motion being prescribed onto the roller follower. The problem is that at the moment when the axis of the roller following the path of the cam profile is at the apex of the salient angle, the trailing portion of the roller still overhangs a part of the dihedral angle on which moment that the roller has just rolled into its momentary position, and which is necessary to bring the roller into that position. For the axis to continue along the side of the ideal dihedral leading away from the apex, parts of the trailing side of the roller must follow paths, which pass through the substance of the cam inside the dihedral face leading to the apex. The portion of the cam leading to the salient must be present to force the roller axis out to the apex, and must be absent to permit the roller to leave the apex with its axis following the desired path. This among other considerations of design for a heart cam shape that requires the axis of a cam roller moving on the cam will be forced to follow a path with a salient angle with a sharp apex is of impractical design. The reentrant and salient angles and their sharp apex angles are typically designed out of the cam design as to allow for a modified non-continuous uniform reciprocating motion.

Many machines, pumps, combustion engine cam shafts utilize what is termed as a three dimensional cam mechanism. A three dimensional cam has an elongated cam profile along the axis of the cam shaft that allows it to change the prescribed cam angle when moved laterally. The cam is moved laterally to expose a variable cam profile to the follower's roller or sphere. This allows for a dynamic change in the prescribed motion being applied to the follower for any given lateral positional moment. It can be a change in stroke length and or type of motion. They typically are not designed as a conjugate cam to cause continuous positive motion. The three dimensional cam of common art would require a heart cam shape to create uniform reciprocating motion from uniform rotary motion. All of the limitations of such a design as described above would limit the practical application such a design into a three dimensional cam mechanism. The combination of a conjugate design and uniform stroke creation is even more impractical.

As common to the state of art for cam designs the body that is being acted upon by the cam will apply a component of normal force along a line of travel for the follower. This line is typically perpendicular to the center of the follower's roller. There is then a line of action of normal force between the cam profile and the follower. There is an angle between the normal force line and the line of action. This angle is dependent on the tangent between the cam profile and follower roller at the best right angle distance of the angular force to the center of the cam. The state art will typically always apply the line of action as angular force with a distance about the center of its mating cam. This allows any sudden impacts on the follower to apply this sudden force to the line of action. That in turn can be converted to impact torque applied to the cam. This in turn applies it to whatever is creating the applied rotary motion to drive the cam typically a motor. This cause impact stresses to be applied to the complete cam system inclusive of the motor. This cause increased wear and reduced life for any given cam system. In addition a force applied to the follower can create torque applied to cause partial cam rotation.

SUMMARY OF THE INVENTION

The embodiments of the present invention address and overcome drawbacks of existing cam designs by providing a cam mechanism for converting constant velocity rotary motion into constant velocity reciprocating motion which does not include a cam having a "heart-shaped" cam profile.

Embodiments of the present invention also provide a cam mechanism of a novel design having an integrated stroke length modulation.

Embodiments of the present invention further provide a cam mechanism that provides substantially uniform reciprocating motion from uniform rotary motion with a smoothness of response over its full rotation. It combines the continuous positive motion of a conjugate cam mechanism with desirable uniform reciprocating motion. It simultaneously has the ability to move laterally to change the type and/or stroke length. It simply combines the attributes of a conjugate cam, uniform motion and the variability of prescribed motion creation. This all can be done at high speeds and loads due to its inherent design that allows for smoothness of response.

Embodiments of the invention further provide a cam mechanism that mitigates impact forces by aligning follower tangents so that the angular force is perpendicular to the center cam and therefore the force line has no distance about the center. The impact force is directed to the center of the cam shaft. It can be designed as to have the two angular forces intersect at a point that they create equal and opposing twisting moments about the center of the common cam shaft. This point is of equal angle and distance from the cam shaft is maintained when the cam is rotated. This does not allow for impact forces applied to the follower to the cam mechanism to be transferred as twisting forces to the drive motor. This is a preferred design for wear and improved life of a cam system as compared to common art. There is an additional benefit, force or thrust applied to the follower cannot be converted to torque as create rotary motion.

To achieve these and other advantages, in general, in one aspect, a cam mechanism for converting rotary motion into a constant velocity reciprocating motion includes a driven shaft rotatable about an axis of rotation. First and second cam members mounted to the driven shaft for conjoined rotation therewith. A first pair of followers is in contact with the first cam member on opposite sides thereof, and a second pair of followers is in contact with the second cam member on opposite sides thereof. The first pair of followers and the second pair of followers mounted to a follower frame for conjoint motion therewith. The first cam member and the second cam member each have a non-cardioid shape cam profile that results in a constant velocity reciprocation motion of the follower frame upon rotation of the driven shaft about the axis of rotation.

In general, in another aspect, the cam profile of the first cam member and the profile of the second cam member are congruent and wherein the cam profile of the first cam member and the cam profile of the second cam member are 180-degrees out of phase about the driven shaft. The cam's surface profiles are so designed to present identical reciprocating motion to its mated roller followers. Proper phasing and cam profile design for each cam applies common rates of reciprocating motion to the follower. This is true for its displacement and return of its stroke.

In general, in another aspect, the first cam member and the second cam member are each a three-dimensional cams and each of the first pair of followers and the second pair of followers are spherical followers.

In general, in another aspect, the first pair of followers and the second pair of followers are longitudinally positional across the cam profile of the first cam member and across the cam profile of the second cam member, respectively, and wherein the longitudinal position of the first pair of followers and the second pair of followers relative to the cam profile of the first cam member and the cam profile of the second cam member, respectively, varies the stroke length of the follower frame between a minimum stroke length and a maximum stroke length.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIGS. 8 through 15 are construction diagrams that schematically depict a conjugate cam and follower design that creates substantially constant velocity (uniform) reciprocating motion from a constant velocity (uniform) rotary motion, wherein:

FIG. 8 depicts the conjugate cam and stroke of the follower at 0-degree/360-degree rotation;

FIG. 9 depicts the conjugate cam and stroke of the follower at 45-degree rotation;

FIG. 10 depicts the conjugate cam and stroke of the follower at 90-degree rotation;

FIG. 11 depicts the conjugate cam and stroke of the follower at 135-degree rotation;

FIG. 12 depicts the conjugate cam and stroke of the follower at 180-degree rotation;

FIG. 13 depicts the conjugate cam and stroke of the follower at 225-degree rotation;

FIG. 14 depicts the conjugate cam and stroke of the follower at 275-degree rotation; and FIG. 15 depicts the conjugate cam and stroke of the follower at 315-degree rotation;

FIG. 23 is a diagrammatic top plan view of the cam mechanism of FIGS. 19 through 21;

FIG. 24 is a diagrammatic side elevation view of the cam mechanism of FIGS. 19 through 21;

DETAILED DESCRIPTION OF THE INVENTION

As a preliminary matter, it should be noted that in this document (including the claims) directional terms, such as "above", "below", "upper", "lower", etc., are used for convenience in referring to the accompanying drawings. Additionally, it is to be understood that the various embodiments of the invention described herein may be utilized in various orientations, such as inclined, inverted, horizontal, vertical, etc., without departing from the principles of the invention.

Several embodiments of a cam mechanism for converting rotary motion into a constant velocity reciprocating motion constructed in accordance with the principals of the present invention are described herein. One embodiment includes a singular prescribed rectilinear reciprocating motion applied to its cam follower and attached driven body. Another embodiment can modulate the prescribed rectilinear reciprocating motion by accomplished by longitudinally moving the conjugate cam or the follower with respect to each other to change their interrelated momentary tangents.

Figure 1:
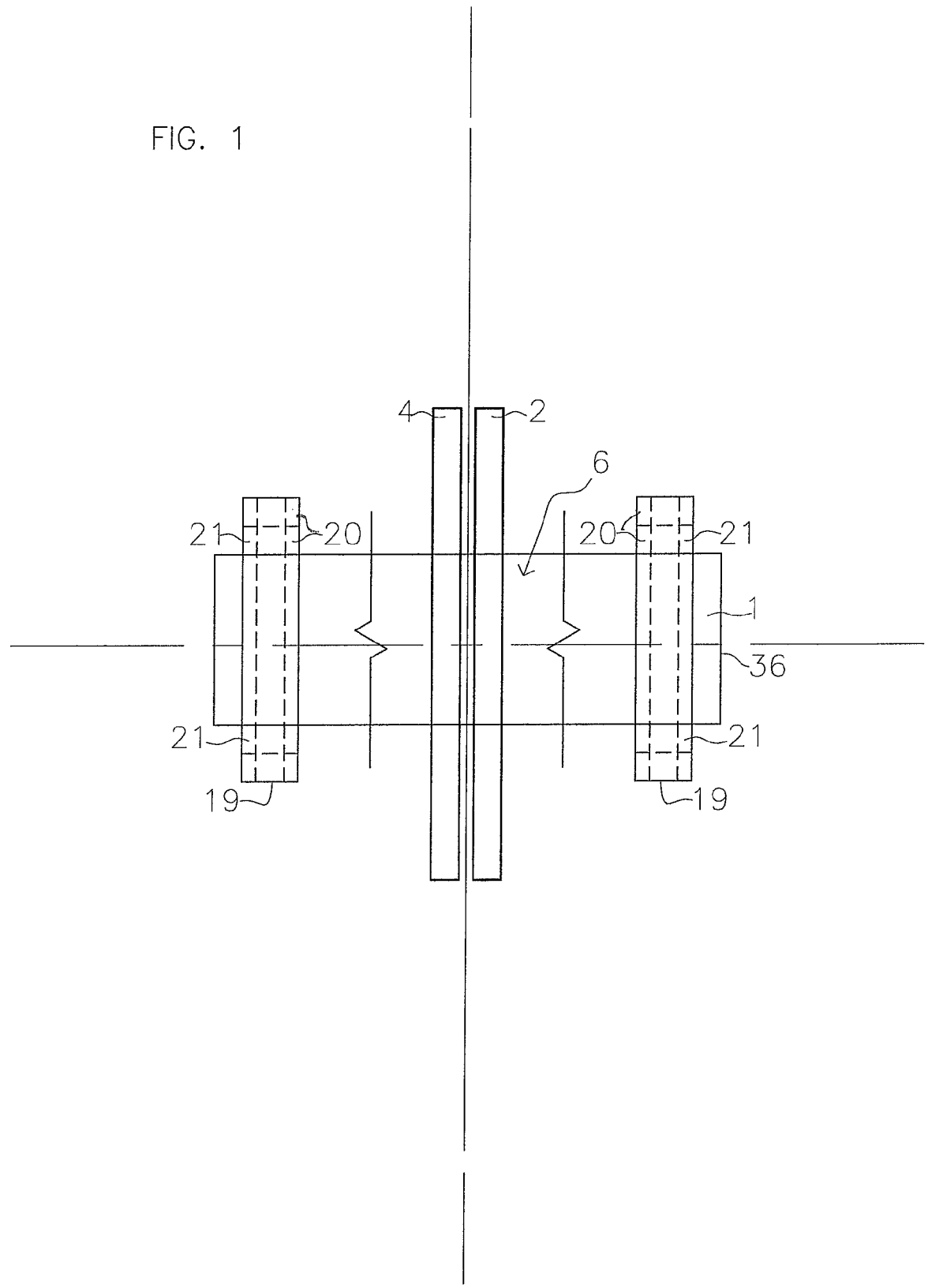
FIG. 1 is a diagrammatic view of a conjugate and congruent cam and cam shaft assembly forming part a cam mechanism constructed in accordance with the principles of the present invention.
Figure 2:
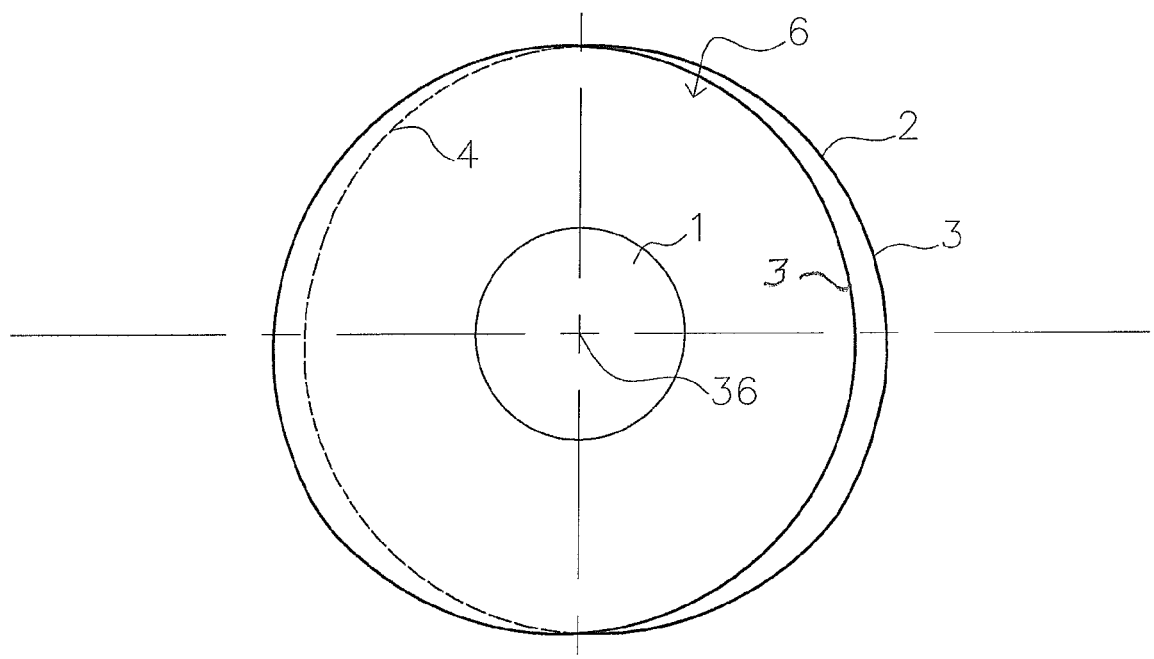
FIG. 2 is a diagrammatic end view of the conjugate and congruent cam of FIG. 1 illustrating the cam shaft with its two cams.
Figure 3:
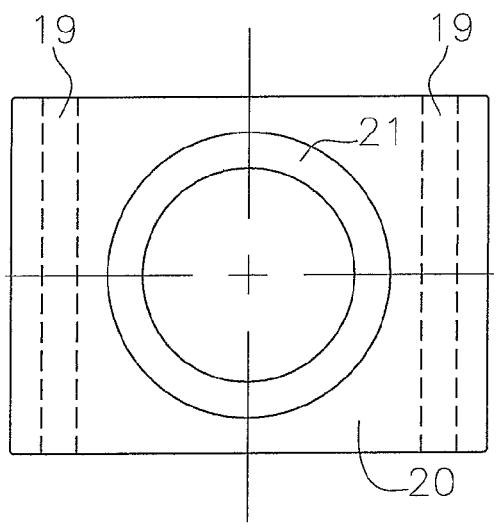
FIG. 3 is a diagrammatic view of a bearing support for the cam shaft of FIG. 1.

A first embodiment of a cam mechanism for converting rotary motion into a constant velocity reciprocating motion is representatively depicted in FIGS. 1 through 15. The first embodiment as shown in FIGS. 1 through 15 illustrates a conjugate cam mechanism that creates a fixed prescribed continuous positive rectilinear reciprocating motion. This motion or stroke is applied to its connector shafts 12a and 12b of the cam follower assembly 8. The connector shafts 12a and 12b would have some form of mechanical coupling to connect to its driven bodies, not shown. The FIG. 1 depicts a cam shaft 1 with two cams 2 and 4 that are connected to the cam shaft 1. They and the shaft 1 form a conjugate cam assembly 6. The cam assembly 6 will require some form of mechanical support or bearing blocks 20. It will have some form of bearings 21 and bolt holes 19, bolts not shown to hold it rigid, but allow free rotation of cam shaft 1. The rotation is typically by a motor not shown. FIG. 2 depicts a typical orientation of the congruent conjugate cams 2 and 4 to the cam shaft 1. Each cam is in its own plane perpendicular to the cam shaft 1. The relationship of each congruent cam is osculated to center line 36.

Figure 4:
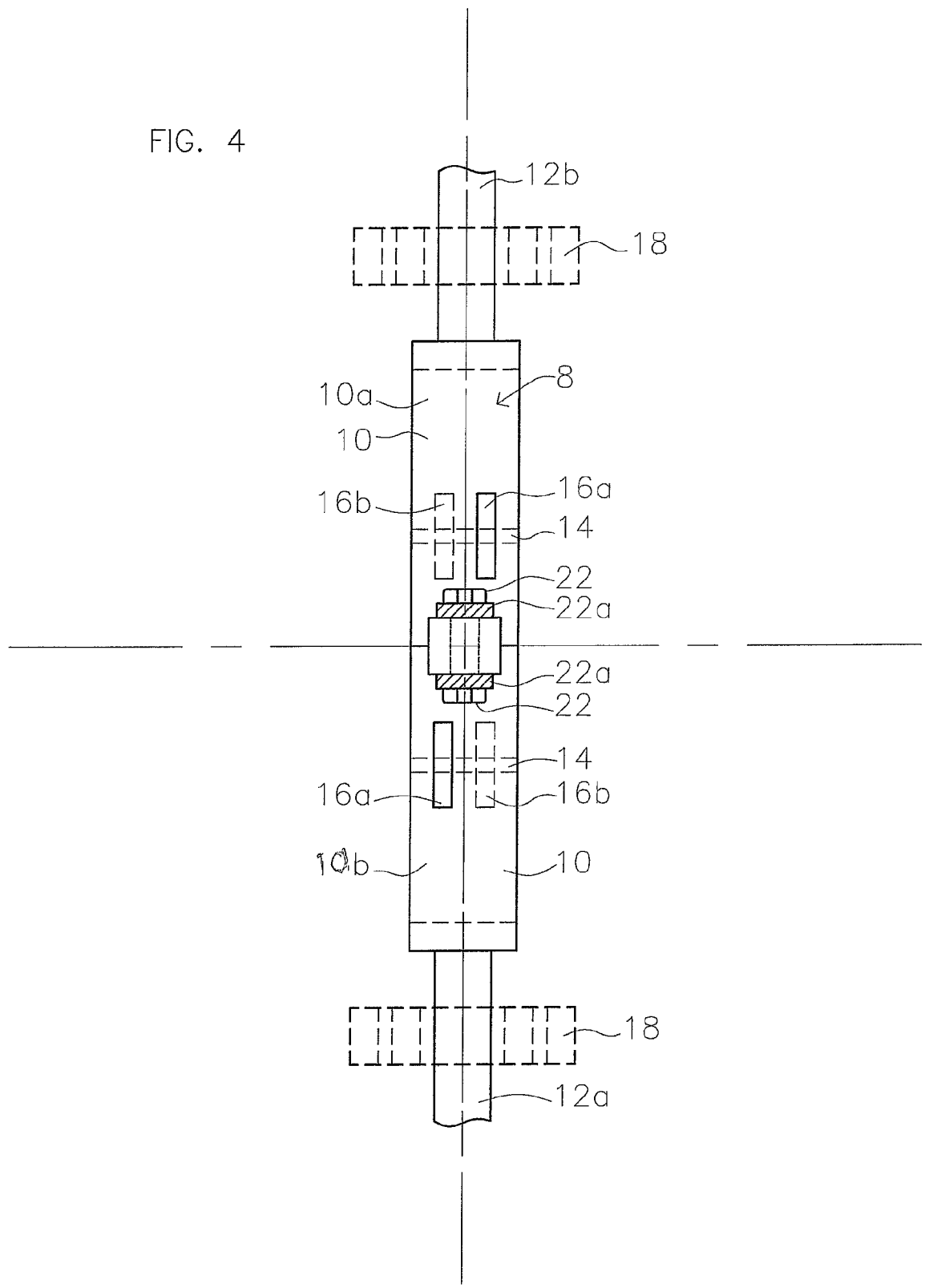
FIG. 4 is a diagrammatic side view of a cam follower assembly forming part of the cam mechanism constructed in accordance with the principles of the present invention.
Figure 5:
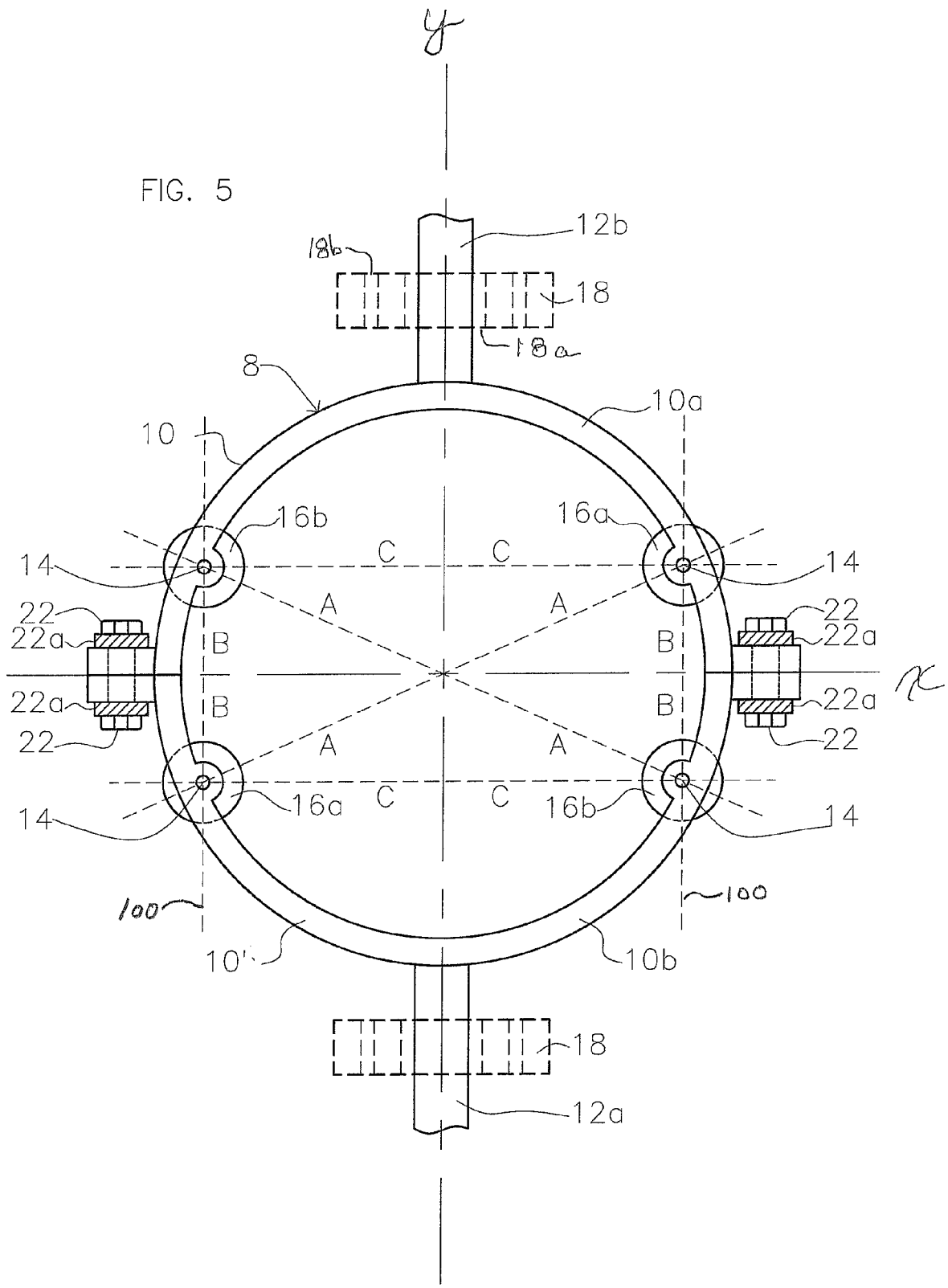
FIG. 5 is a diagrammatic front view of the cam follower assembly of FIG. 4.

FIGS. 4 and 5 are of a cam follower assembly 8. It has four rollers divided into two pairs. These rollers can be cylindrical, spherical or other not shown. Each pair has one roller 16a and one roller 16b. These rollers are equally divided across the cam shaft 1 with roller 16a on one cam and roller 16b on the other cam. It is possible to make one cam larger than the other, not shown. The shape of the cams would be the same and the relationship to the center would be the same. The difference would only be the tracking velocity of the roller to cam surface for the same stroke. The tracking velocity change would be equally proportional to the size difference between the two cams. Each roller pair 16a and 16b is in a longitudinally plane with a perpendicular and congruent relationship to the Y axis plane. The opposing pair has the same relationships. Each cam will have two mated rollers 16a and rollers 16b at constant tangents 44. The follower frame 10 is in two halves 10a and 10b that are connected and held with bolts 22. One pair of rollers 16a and 16b are connected to each half 10a and 10b of follower frame 10. Each roller is connected to follower frame 10 with a shaft 14. The dimension lengths for all of A to A, B to B and C to C are congruent. The dimension A is defined as the distance between the intersections of X and Y axis to the centers of the shafts 14. The centers of bearing shafts 14 intersect on both planes 100 that are parallel to the Y-axis. The dimension of B is defined as the length from the centers of shafts 14 to the X-axis line. The distance of C is defined as the distance between the Y-axis to the centers of shafts 14. The frame 10 has reciprocating cam sections 12a and 12b. This is the portion of the follower 8 that is operatively connected to drive the connected structure or body that is reciprocated.

Figure 6:
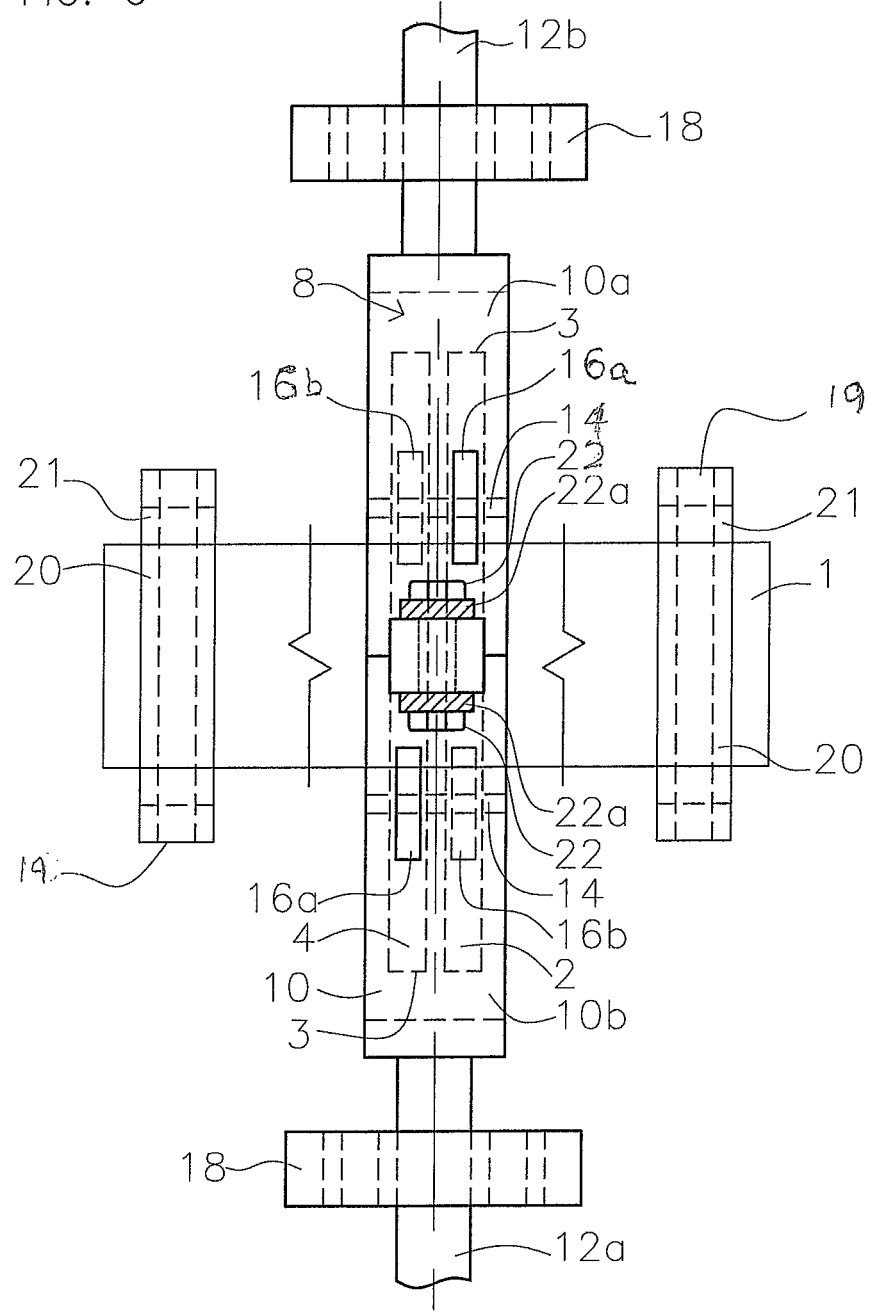
FIG. 6 is a diagrammatic side view of a cam mechanism constructed in accordance with the principles of the present invention and comprising the assembly depicted in FIGS. 1 through 3 and the cam follower assembly depicted in FIGS. 4 and 5.
Figure 7:
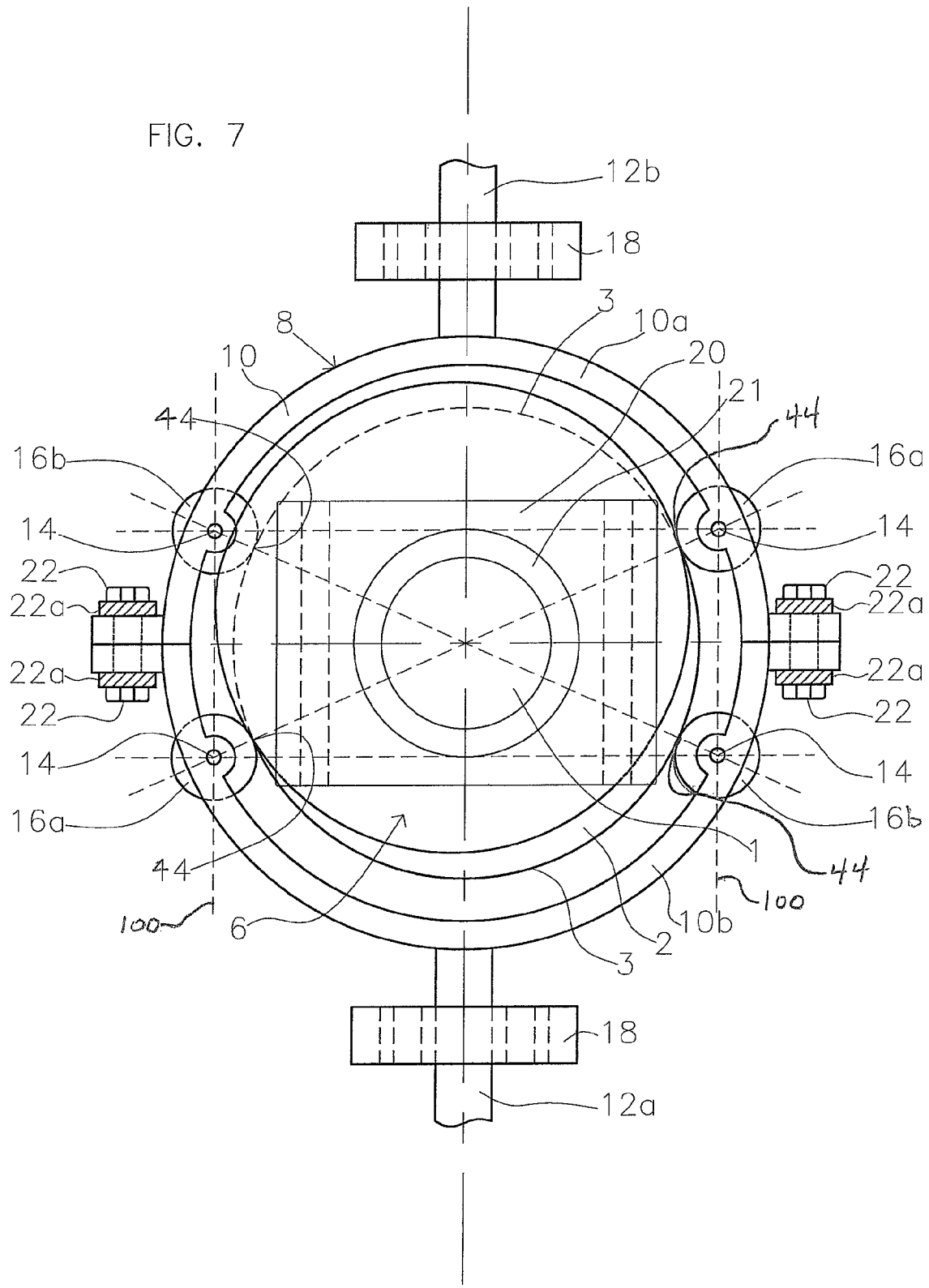
FIG. 7 is a diagrammatic front view of the cam mechanism of FIG. 6.

FIGS. 6 and 7 is the combination of FIGS. 1, 2, 3, 4 and 5. When the assembly of the follower 8 is installed about the conjugate cam assembly 6 the two halves 10a and 10b of the cam follower frame 10 are bolted together with bolts 22. Optional springs or Bellville washers 22a maybe included to compensate for manufacture tolerances and long-term wear between the cams and follower rollers. They shall have sufficient stored force to keep the rollers 16a and 16b in continuous tangent moments 44 at cam surface profiles 3 to the cams 2 and 4. With proper manufacturing tolerances 22a may not be required. This will cause a continuous encapsulating relationship of assembly 8 to assembly 6. This assures constant 44 tangent moments when the invention is operated. The bearing block assemblies 20 and linear bearing blocks 18 combined to rigidly constrain the two assemblies 6 and 8. The bearing blocks 20 allows for the cam assembly 6 to rotate and impart reciprocating motion or stroke to the encapsulated follower assembly 8. The bearing block assemblies 18 with its linear bearings 18a keep follower connector shafts 12a and 12b rigidly aligned to allow for free rectilinear reciprocation of 12a and 12b. The holders 18 and 20 are attached to the device that is utilizing the cam mechanism with bolts not shown passing through holes 18b and 19.

Figure 8:
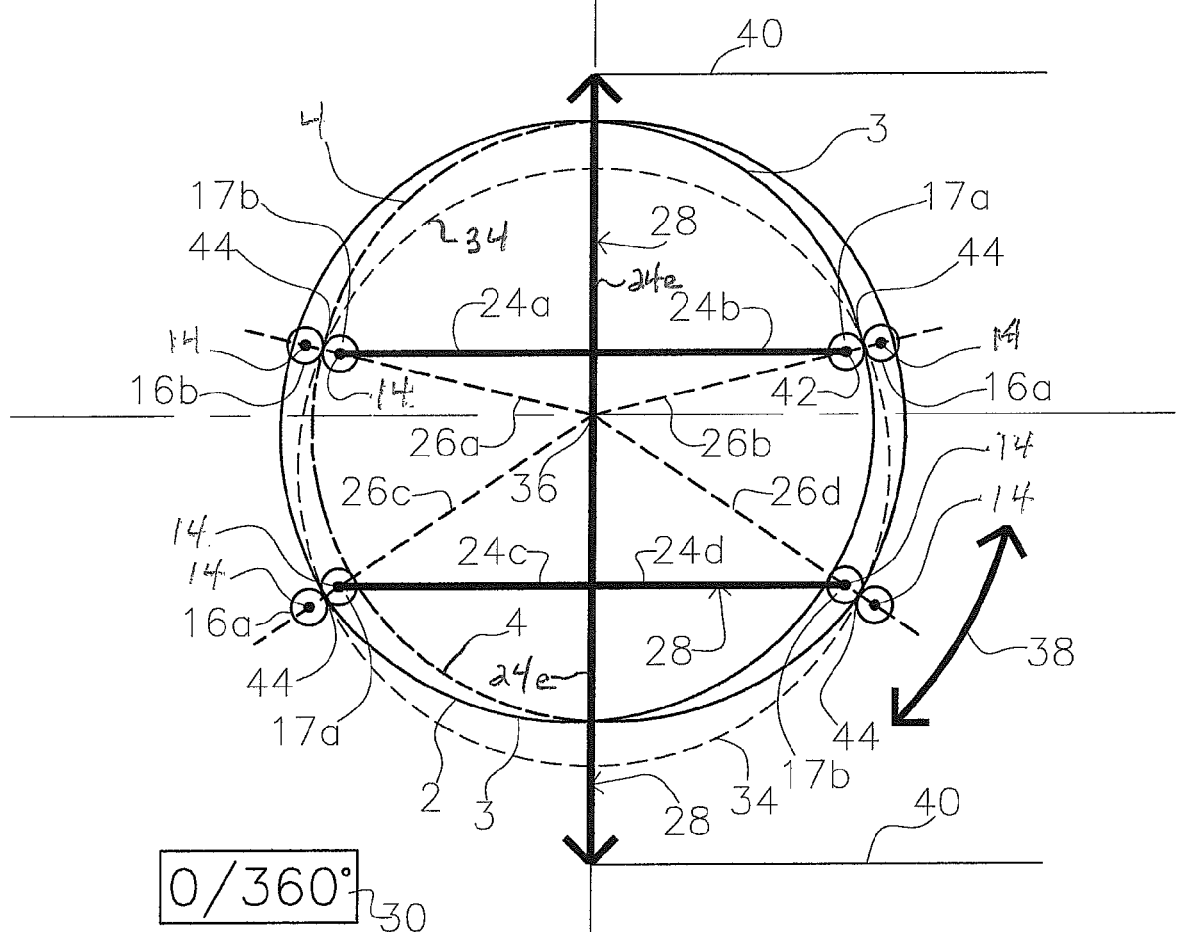
Figure 9:
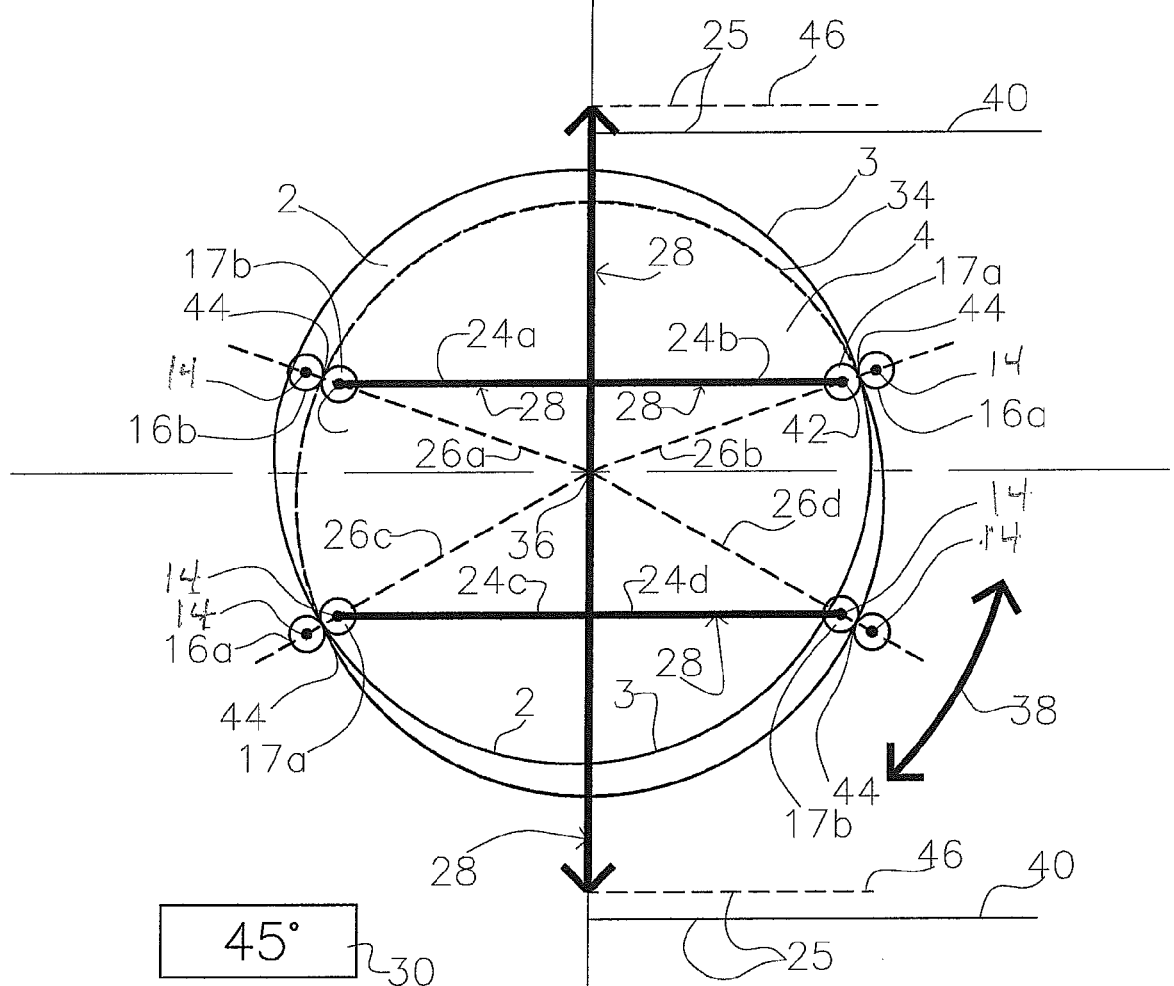
Figure 10:
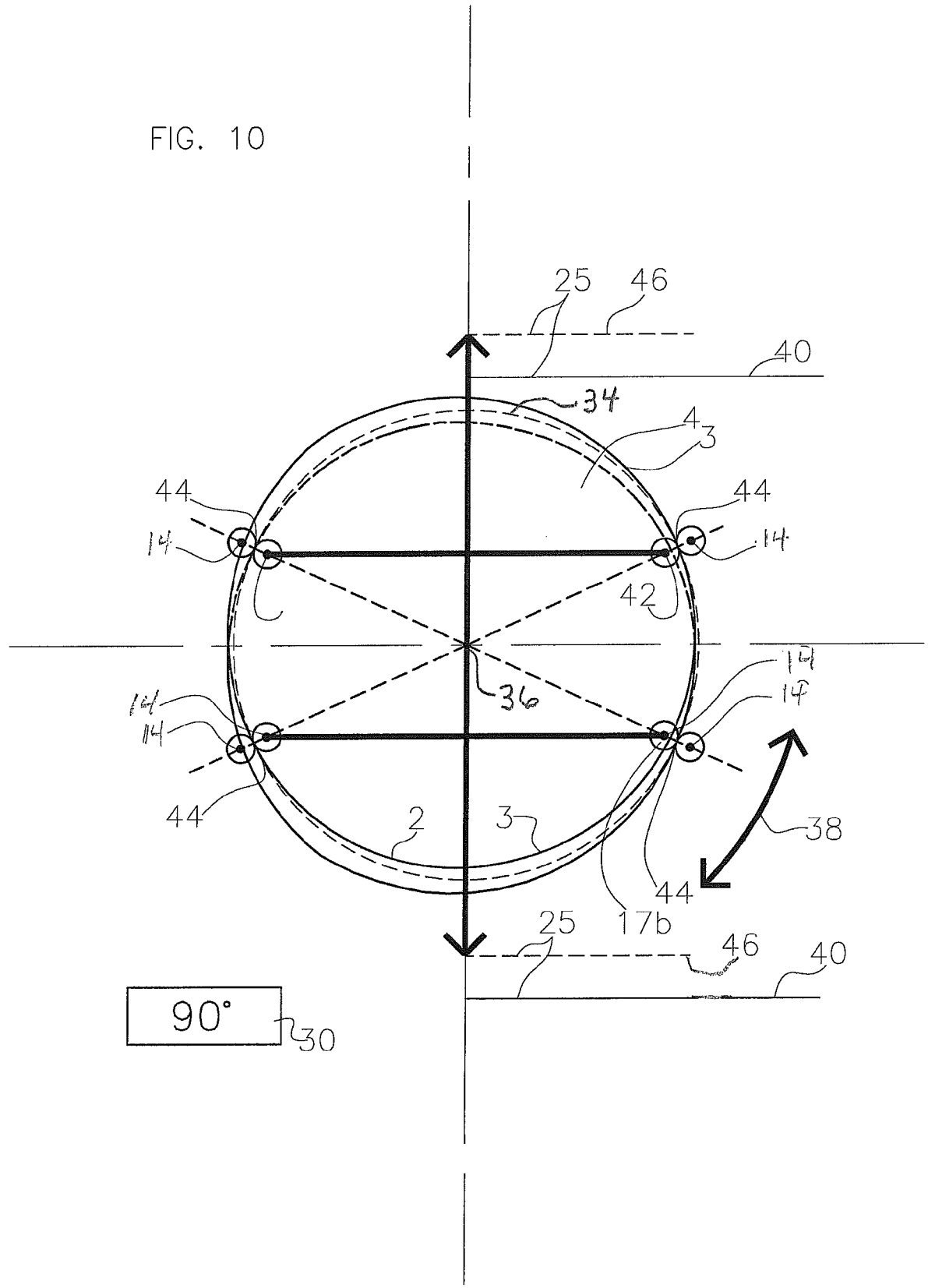
Figure 11:
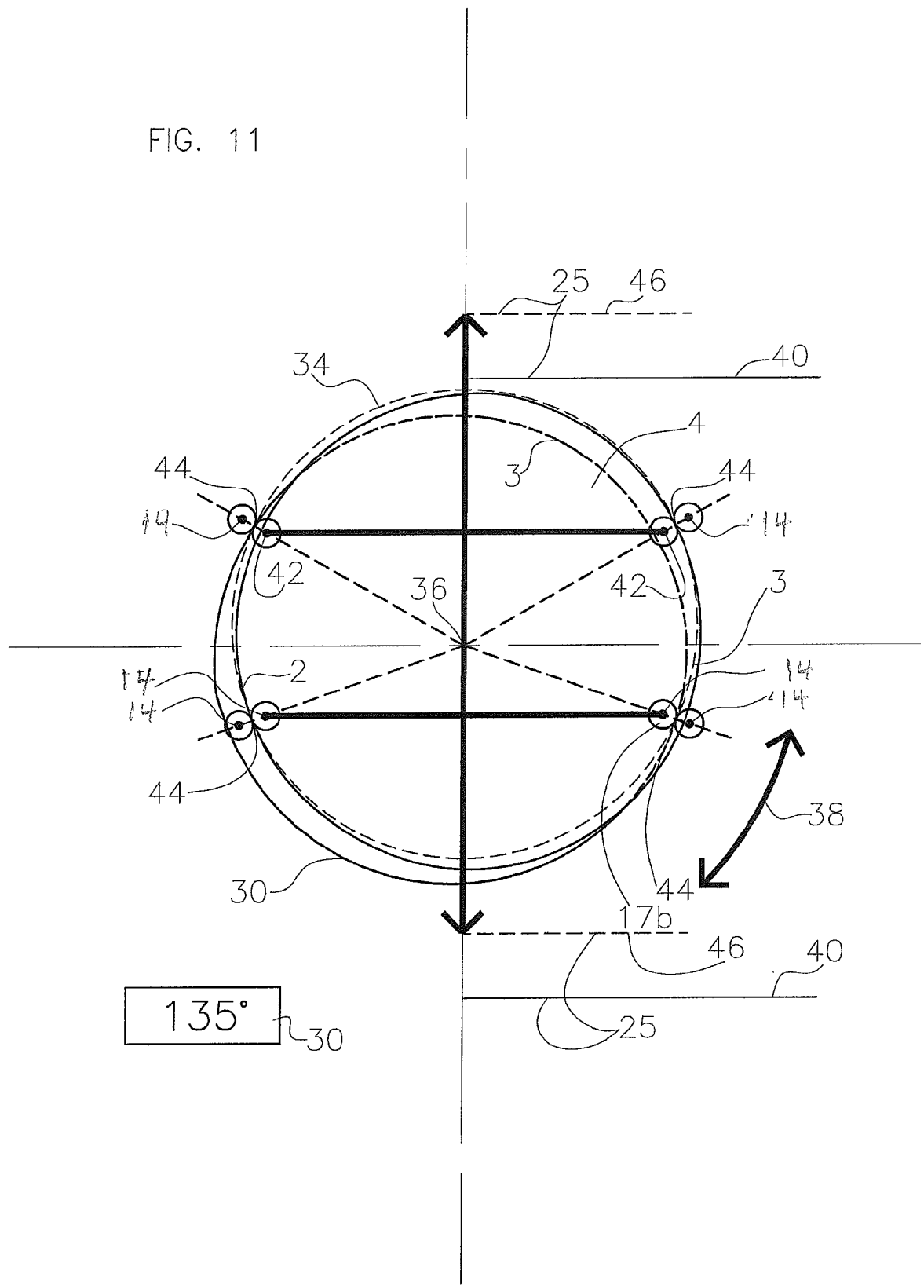
Figure 12:
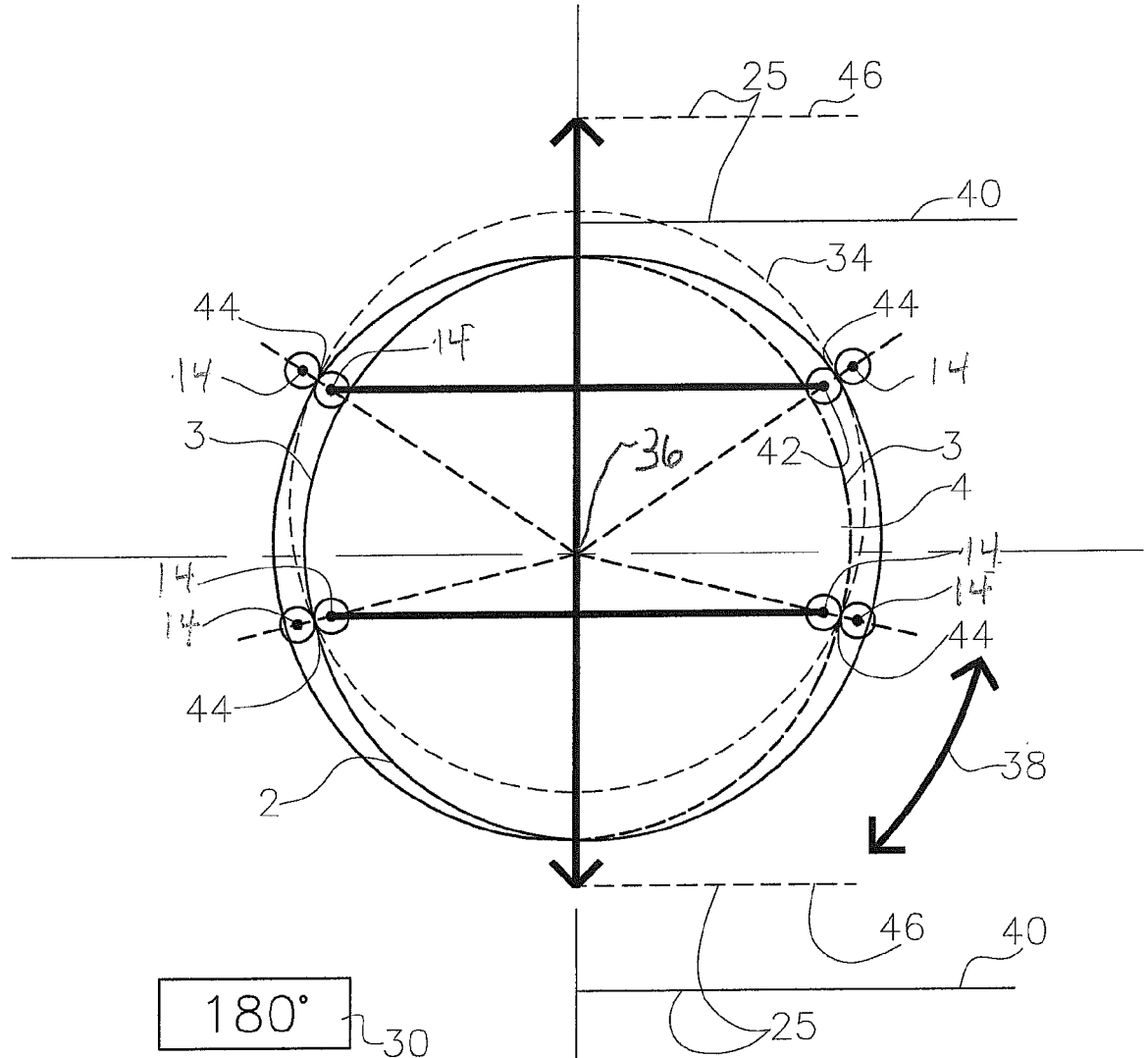
Figure 13:
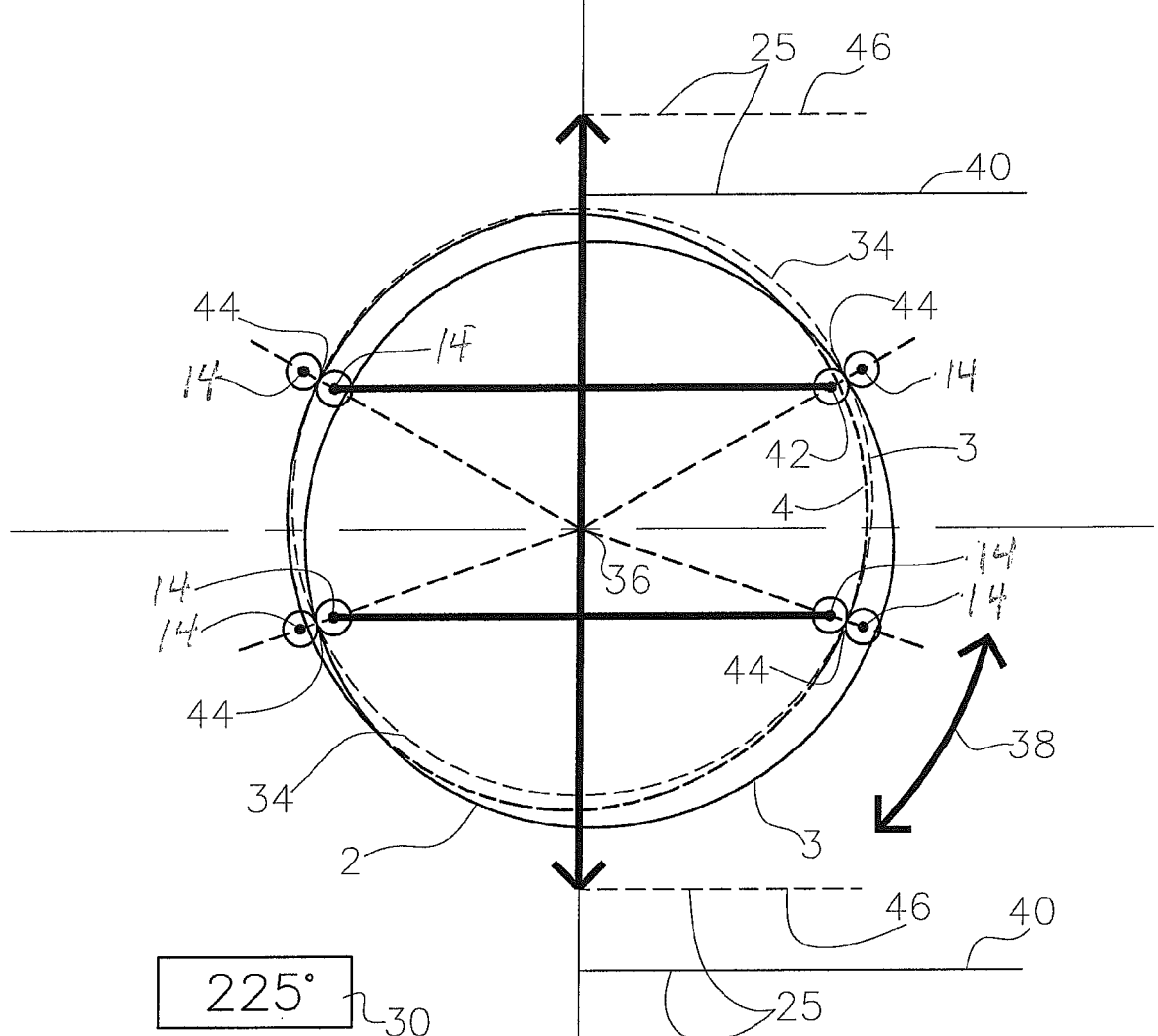
Figure 14:
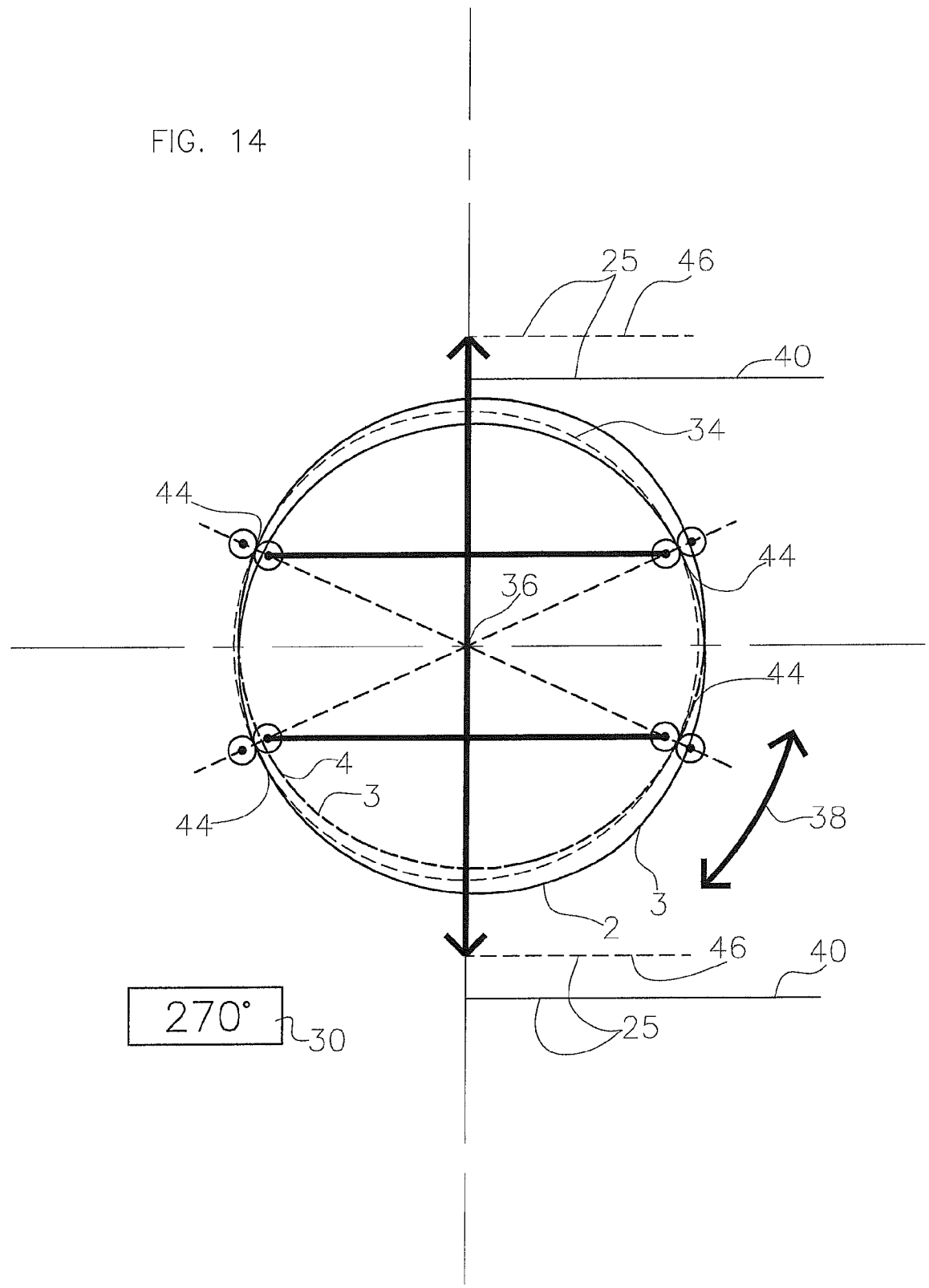
Figure 15:
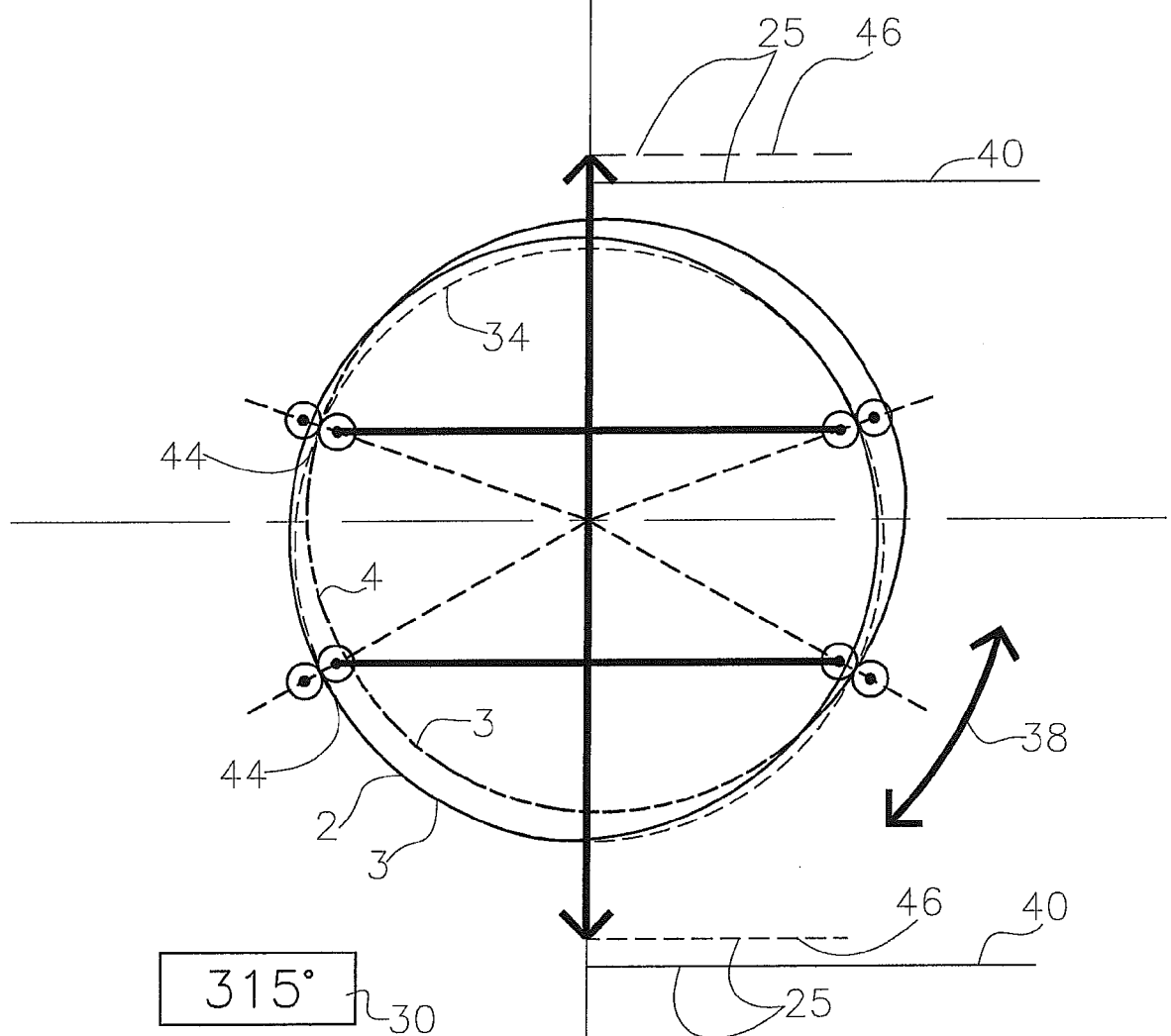

The FIG. 1 through 15 all depicts an example of substantially uniform reciprocating motion. This uniform motion is uniquely created without heart shaped cams. Many other forms of reciprocating motion can be created by the invention, but not shown. Such as sinusoidal, modified sinusoidal, parabolic and others not mentioned. These drawings depict the relationships between the invention's rollers 16a and 16b and the cams 2 and 4 at their 44 tangents. The FIG. 8 is at the rotational moment 0/360° or starting reference point for the cam angle 38. The FIG. 8 through FIG. 15 progresses at 45° of cam angle rotation 38. The cam angle of rotation 38 would be 360°. Substantially uniform reciprocating motion will have a given percentage of cam angle rotation creating an equal proportional percentage of reciprocating motion. FIGS. 8 to 15 depicts a stroke length that ends at 46 from reference point 40 for each FIGURE. This would result in substantially equal stroke distances between position marks 40 and 46 for each of the FIGS. 8 to 15. The follower assembly 28 represents the motion of the follower assembly 8. Assembly 28 is composed of a representative rigid structure with the four roller followers made up of two pairs of 16a and 16b position external or internal to the cams 2 and 4. The rollers 17a and 17b are shown as an example of a design for rollers internally positioned to cams 2 and 4. This demonstrates that rollers could be external or internal or both in any given design. The cam's radii 26a, 26b, 26c and 26d are positioned to cams 2 and 4. These radii intersect the center 36 through the tangential points 44 and intersect the roller centers 42. This creates an osculated relationship between the cams 2 and 4 surface profiles 3 at tangential points 44 to the center 36 and to the roller centers 14. The radii lengths are congruent for paired radii 26a and 26b and the same for the paired radii 26c and 26d. As the cam assembly 6 is rotated the congruent lengths for the paired radii change, but the congruent radii length relationship is preserved for each pair. The lengths of 24a, 24b, 24c and 24d of follower assembly 28 as defined by the distance between 24e on the Y axis and roller centers 14 are always the same. There is always a theoretical projected circle 34 that will intersect at all four of the tangents 44. This relationship for circle 34 is preserved at all cam angles of rotation 38. This theoretical circle 34 has a constant radius for a given design. It is possible to have the radii intersect at a point other than the rotational center 36 and be osculated to that alternate point. The pair length relationship of radii 26a to 26b and 26c to 26d will remain congruent in length for each pair. This intersecting point will trace a circle about the center 36. It is not shown, because it is very dependent on multiple variables. The theoretical circle 34 will move equally proportional to the stroke. This theoretical circle is a projected circle in two planes 100 when viewed from an end view, such as FIG. 7. Each plane is perpendicular to the cam shafts center line 36 and the bearing tangents 44 on its mated cam 2 or 4.

Operationally a motor or other driver via some form of gearing or pulleys attached to the cam shaft 1 (not shown) will cause rotation of the cam shaft assembly 6. The shaft assembly 6 that is held by the cam shaft bearings holder 20 bolted through holes 19 to anchor and attach the cam assembly 6 to the device or machine that is utilizing the cam mechanism. The rotation of the cam 6 assembly by a driver applies a certain prescribed motion to its mated cam follower assembly 8. The follower assembly 8 will have a prescribed motion based on the conforming of the roller tangents 44 following the prescribed conjugate cam 2 and 4 surface profiles 3. The cam follower assembly 8 encapsulates the cam shaft assembly so that its constrained by the sustained tangents 44 at surface profiles 3 of the two pairs of rollers 16a and 16b to their mating cams 2 and 4 respectively. This relationship of positional tangents is maintained for all cam angles 38 of rotation. This allows for the prescribed cam profiles 3 of cams 2 and 4 to apply its designed motion to rollers 16a and 16b as the cam assembly 6 is rotated. This assembly relationship of cam assembly 6 and follower assembly 8 is always in positive contact to each other at the four tangent 44 and the conjugate cam surface profiles 3. When the conjugate cam assembly 6 is rotated its cams 2 and 4 will apply rectilinear reciprocating motion to its mating follower assembly 8. This reciprocating motion is positively applied to the connecting shafts 12a and 12b. This applies positive continuous reciprocating motion or stroke to the direction of displacement or rise and return. This is then reversed when the direction of stroke is reversed 40 to 46 and 46 to 40. This causes continuous positive motion being applied to the follower assembly 8 at all angles 38 of rotation. The rigid linear bearing holder of 18 constrains and aligns the position of the follower assembly 8 at 12a and 12b. When cam assembly 6 as shown in FIGS. 6 and 7 is rotated uniformly the cams 2 and 4 surface profile 3 will impart substantially uniform reciprocating motion to follower assembly 8. This substantially uniform or other form of reciprocating motion of follower assembly 8 will in turn be applied to 12a and 12b shafts. The body or bodies connected at shafts 12a and 12b will have the prescribed rectilinear motion or stroke 25 applied to them. This reciprocating motion is applied as stroke 25 with smooth response. This uniform reciprocating motion can be applied at high speeds and loads. The choice for a type of reciprocating motion is based on the requirements of an application. As the driver continues to rotate the cam shaft 1 the process of reciprocating motion is sustained.

Figure 16:
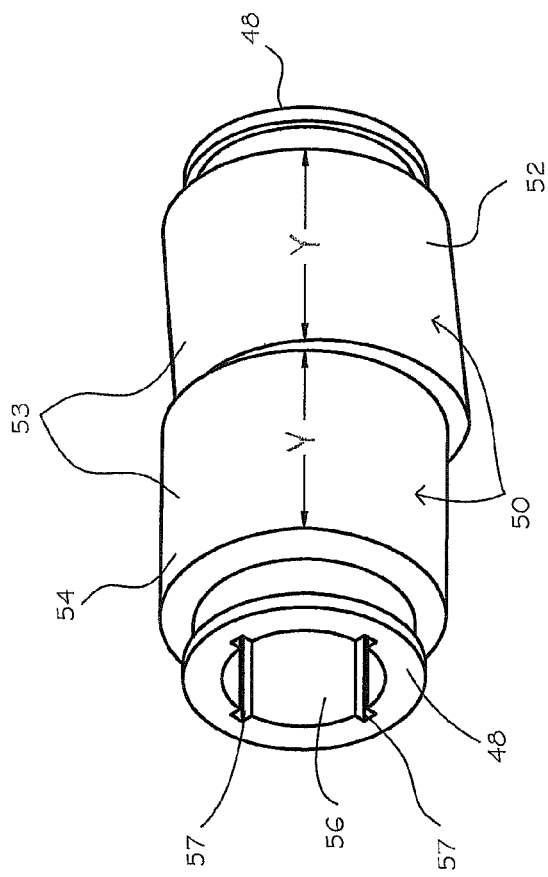
FIG. 16 is a diagrammatic perspective view of a 3-dimensional conjugate cam in accordance with the principles of the present invention.

The second embodiment of the invention as shown in FIG. 16 has a third "Y" dimension to elongate the cam surface profile 3 of cams 2 and 4 of the first embodiment FIG. 1 through 15. This creates a conjugate congruent three dimensional "3D" cams 52 and 54 with elongated cam surface profiles 53. This creates a 3D cam assembly 50. The cam geometries of 52 and 54 are congruent.

Figure 17:
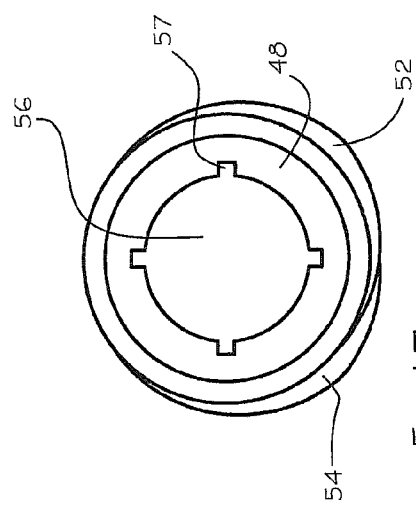
FIG. 17 is a diagrammatic end view of the 3-dimensional conjugate cam of FIG. 16.
Figure 18:
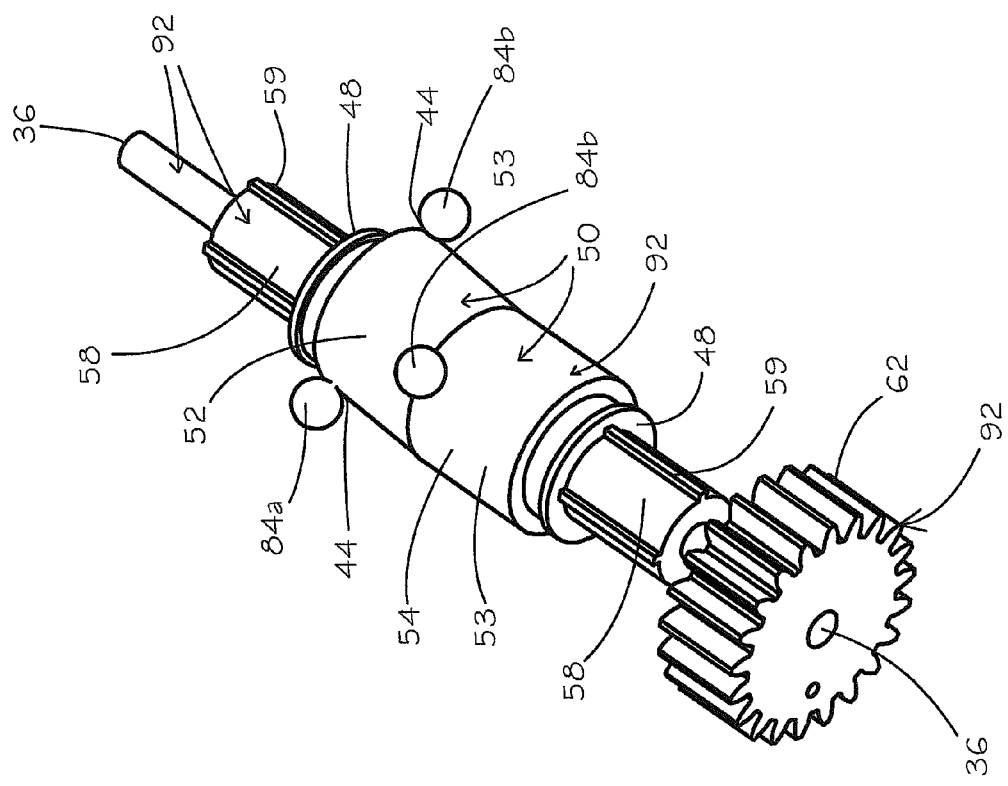
FIG. 18 is a diagrammatic, partial assembly of the 3-dimensional conjugate cam and drive shaft.
Figure 19:
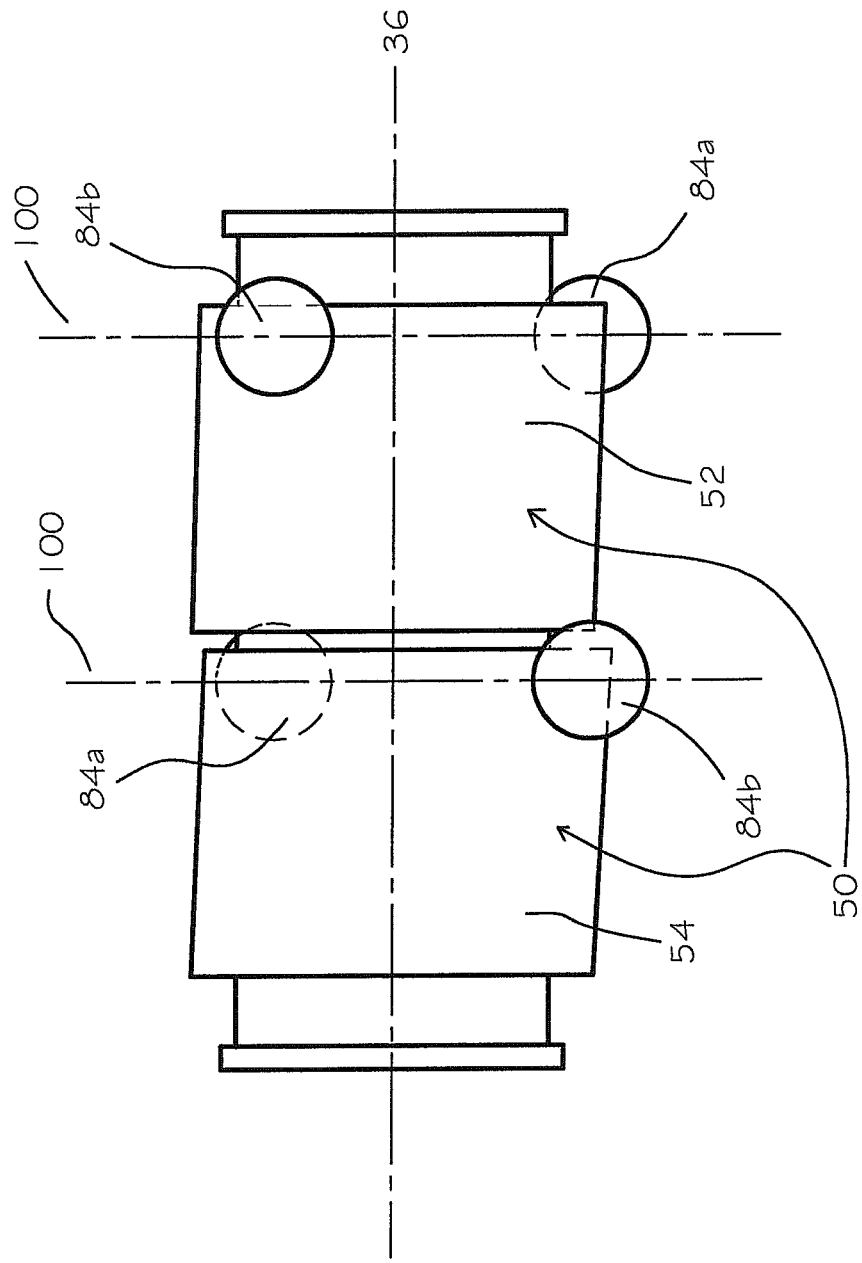
FIG. 19 is a diagrammatic view of the 3-dimensional conjugate cam of claim 16 representatively depicting the four spherical cam followers in contact with the cam's conjugate profiles.
Figure 20:
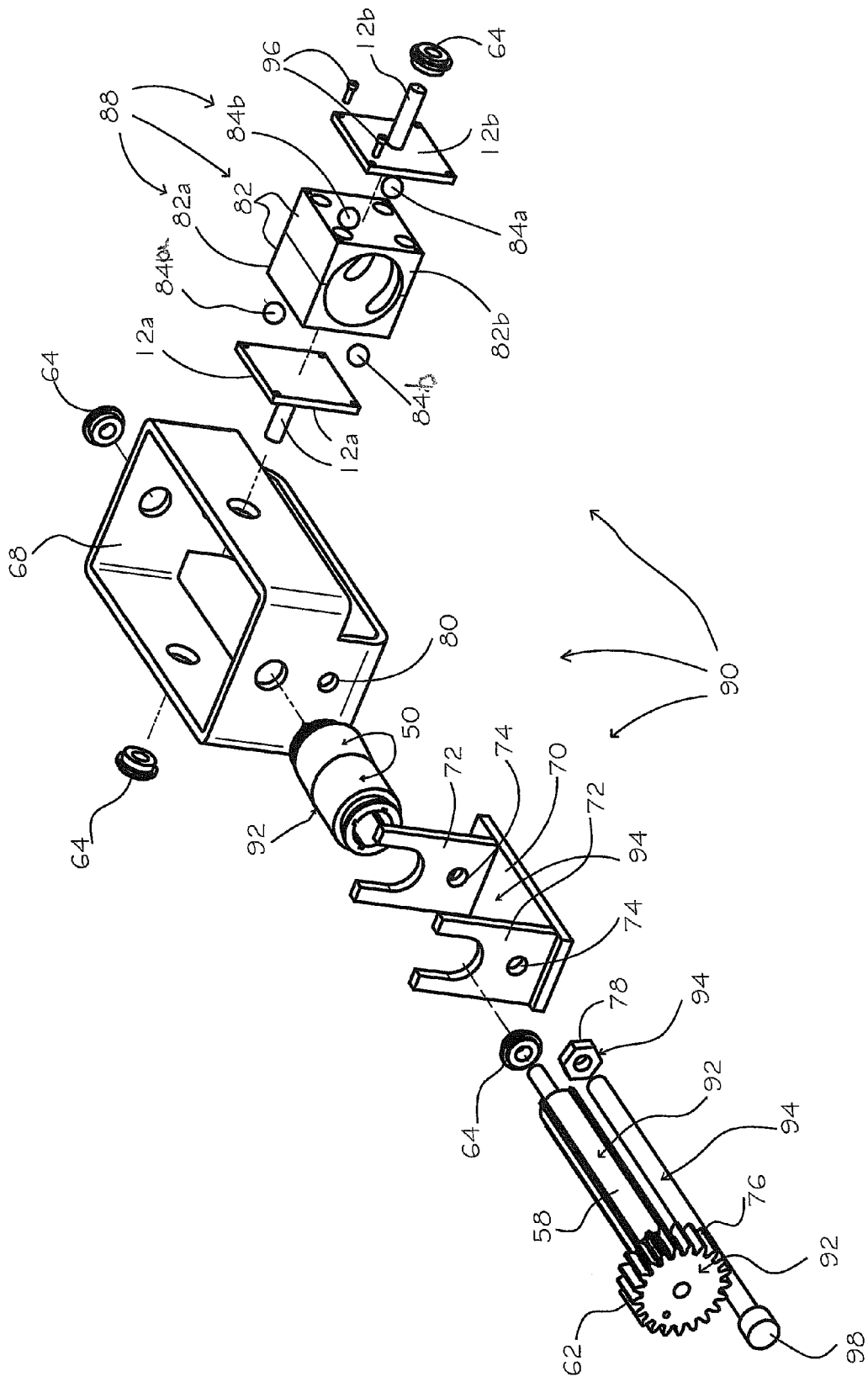
FIG. 20 is a diagrammatic exploded assembly view of a cam mechanism comprising a 3-dimensional conjugate cam in accordance with the principals of the present invention.

FIGS. 16 and 17 depicts the "3D" conjugate cam assembly 50 composed of two integrated elongated cams 52 and 54. The surface areas are integral thrust washer 48 of the cam assembly 50. The cam assembly 50 has an internal full axial hole 56 with spline grove lines 57 through its center. It is parallel to center line 36. As shown in FIG. 18 the 3D conjugate cam assembly 50 is fitted over it mates to its drive shaft 58. There is a high tolerance clearance between the axial hole 56 of the 3D cam assembly 50 to its mated cam drive shaft 58. The drive shaft 58 has raised splines 59 that integrate into the cam assemblies splined groves 57. This creates an integrated rotationally relationship and an aligned movable lateral motion relationship of the 3D cam assembly 50 to its mated cam drive shaft 58. The splined drive shaft 58 has a drive gear 62. This can be any form of rotary transfer mechanics. It is meant to mate with other drive gears not shown. FIG. 18 also shows positional points for three of the four sphere bearings 84a or 84b and the center line 36 for the drive shaft 58. The drive shaft 58, cam assembly 50 and drive gear 36 comprise the shaft driven 3D cam assembly 92. FIG. 19 is the cam assembly 50 with the four spherical bearings of two 84a and two 84b. Theses bearings have their centers intersecting to the two planes 100. Two bearings on each plane 100. The drawings depict spherical bearings, but other designs can be used such as rollers. If rollers were utilized there would be some form of mechanical support to hold the rollers not shown. The rollers would have to be allowed to freely pivot to stay parallel to the cam profiles 53. As shown in FIG. 20 the drive shaft 58 is supported by bearings 64. These bearings 64 are held in the cam assembly frame 68. The conjugate cam assembly 50 is positional held by the stroke adjustor frame 70. The stroke adjustor frame 70 has two perpendicular arms 72 that are in positional contact with thrust washers 48 of the cam mechanism 50. The stroke adjustor rod 76 is connected to stroke adjustor frame 70 at threaded holes 74 and locked in place by nut 78. The threads of 74 and 76 are not detailed. The stroke adjustor rod 76 is aligned and held to the cam assembly frame 68 by alignment holes 80. When the stroke adjustor frame 70 is held in place within the cam assembly frame 68 the rod 76 and cam assembly frame 68 is constrained and aligned to allow for lateral motion only. The stroke adjustor frame 70, stroke adjustor rod 76, lock nut 78 comprise the stroke adjustor assembly 94 that fits into the cam assembly frame 68. The cam stroke adjustor shaft 76 has a position 98 that would be some form of coupling to facilitate the lateral cam motion not shown. The "3D" cam assembly 50, drive gear 62 and the drive shaft 58 comprise the cam assembly 92 with its drive shaft. The follower assembly 88 is comprised of 82a and 82b of 82, 12a, 12b, rollers or spherical bearings two 84a and two 84b and bolts 96. The follower holder 82 has two pieces 82a and 82b. The holder 82 confines the four bearings of two pairs of 84a and 84b. As shown they are spherical for this design, but can be of different design for other applications such as rollers. The spherical geometry is the simplest to design, but may have practical design limitations that a cylindrical roller would solve. The connector shafts 12a and 12b with their mounting flanges are held connected by bolts 96. The bolts 96 traverse through follower holder 82 assembly to attaché 12a to 12b and hold the center 82 section together and retain the spherical bearings of 84a and 84b. There is no equivalent 22a spring or Bellville washer in this design, but may be necessary for many applications to allow for manufacturing tolerances and wear. The follower assembly holder 88 encapsulates the cam assembly 50. The cam follower assembly 88 is continuously constrained by its tangents 44 to the surface area profiles 53 of the conjugate cams 52 and 54. The cam follower assembly 88 is further constrained by the connector shafts 12a and 12b being held in rigid alignment within the linear bearings 64. This combination of two defined mechanical constraints holds the cam follower 88 assembly in proper position. As shown on FIG. 20 assemblies 88, 92, 94 and cam assembly frame 68 with its bearings 64 comprise the cam assembly mechanism 90.

Figure 21:
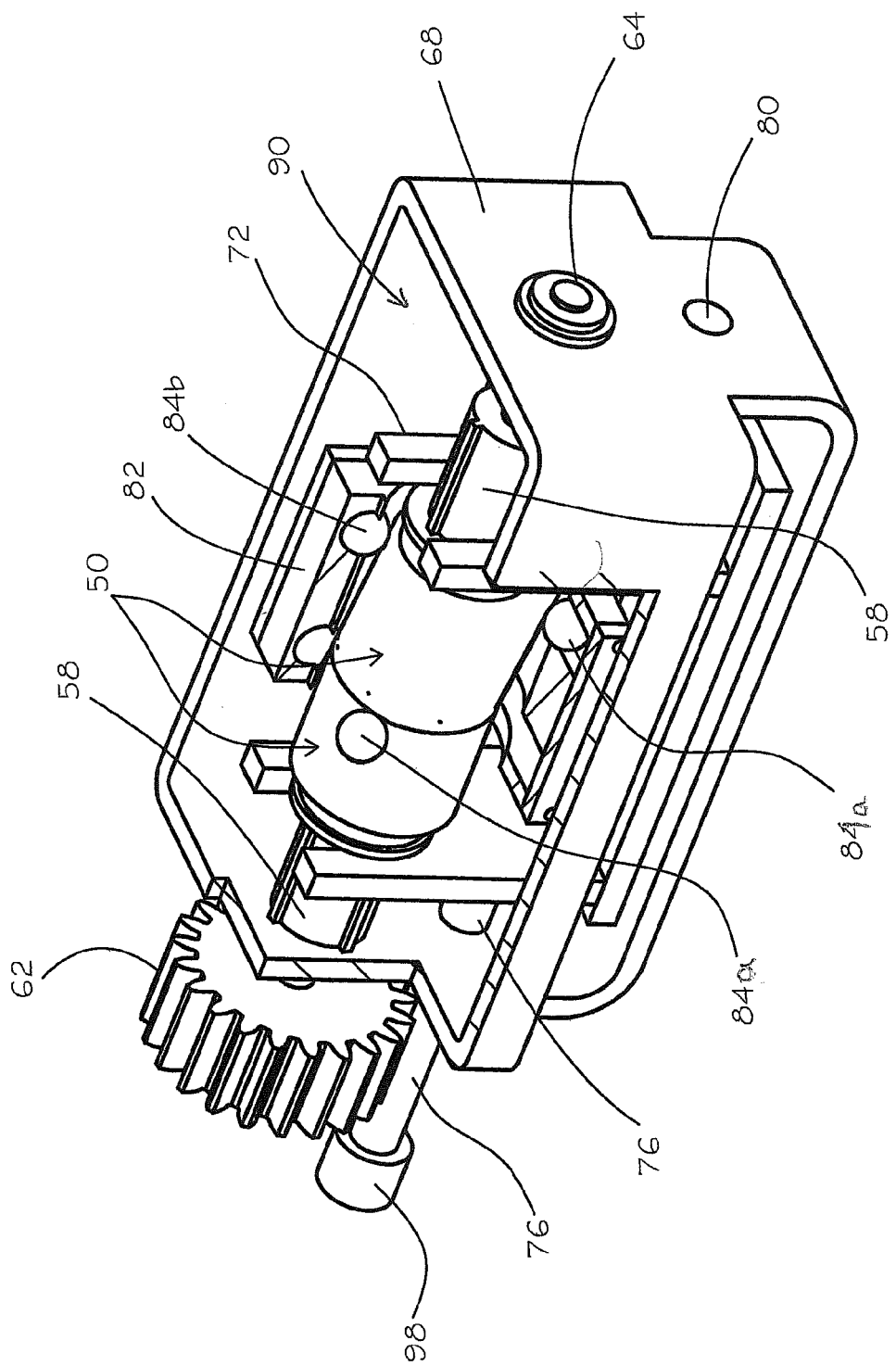
FIG. 21 is a perspective diagrammatic and partial sectional view of the cam mechanism of FIG. 20.
Figure 22:
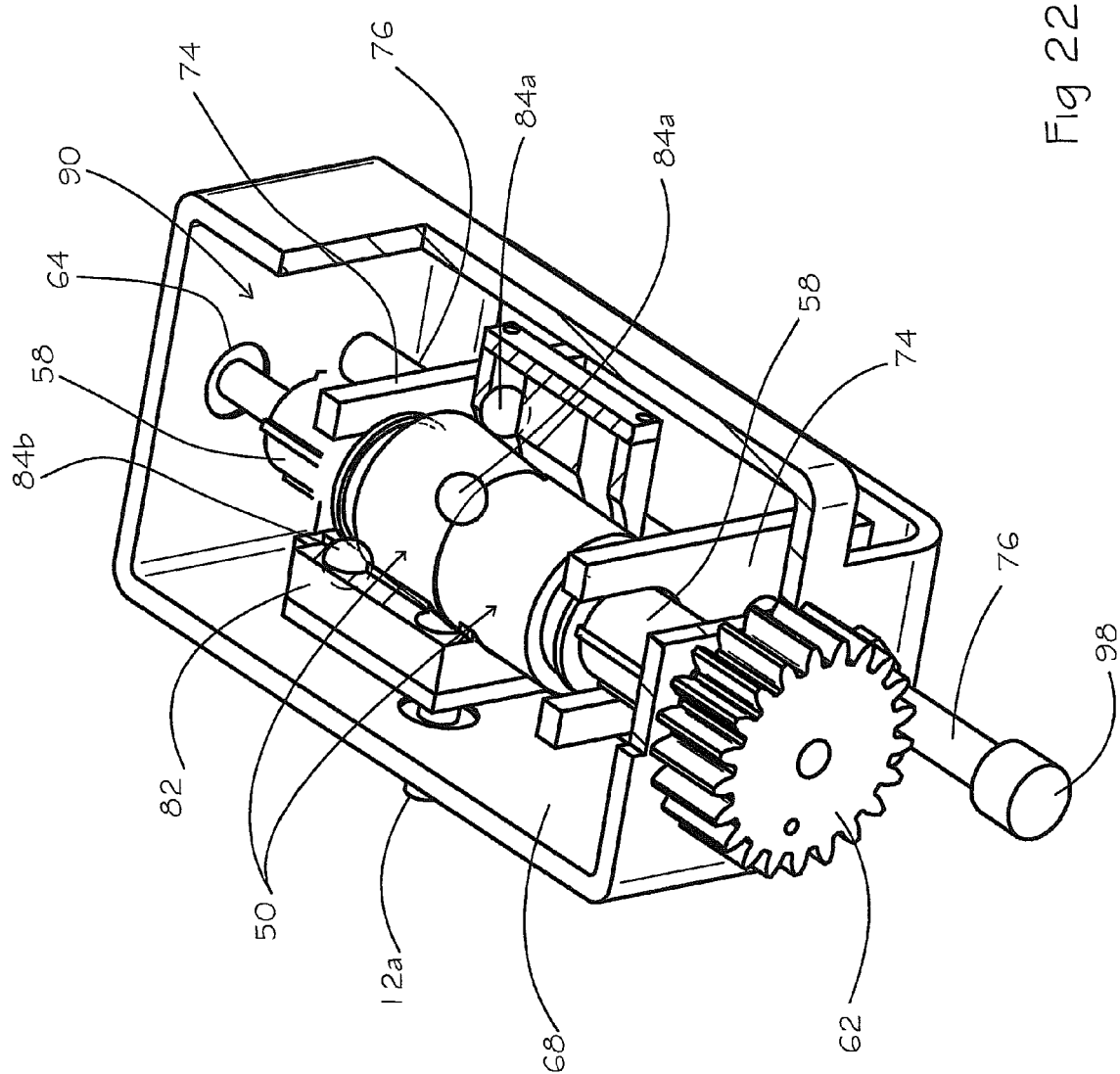
FIG. 22 is a perspective diagrammatic and partial sectional view of the cam mechanism of FIG. 20 as seen from the opposite side of FIG. 21.
Figure 27:
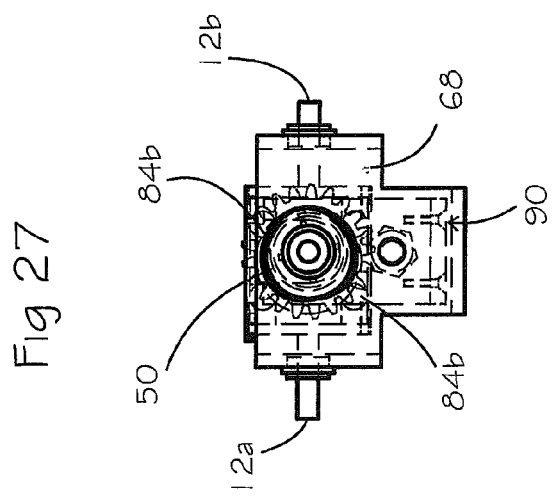
FIG. 27 is a diagrammatic second end view of the cam mechanism of FIGS. 19 through 21.
Figure 25:
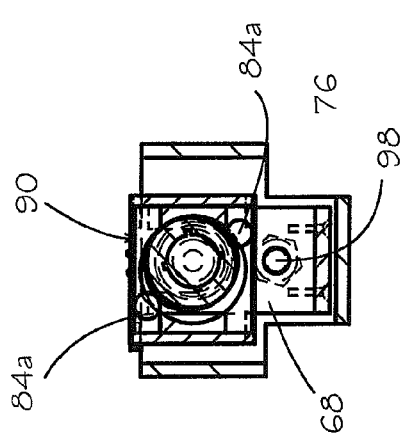
FIG. 25 is a diagrammatic first end view of the cam mechanism of FIGS. 19 through 21.
Figure 26:
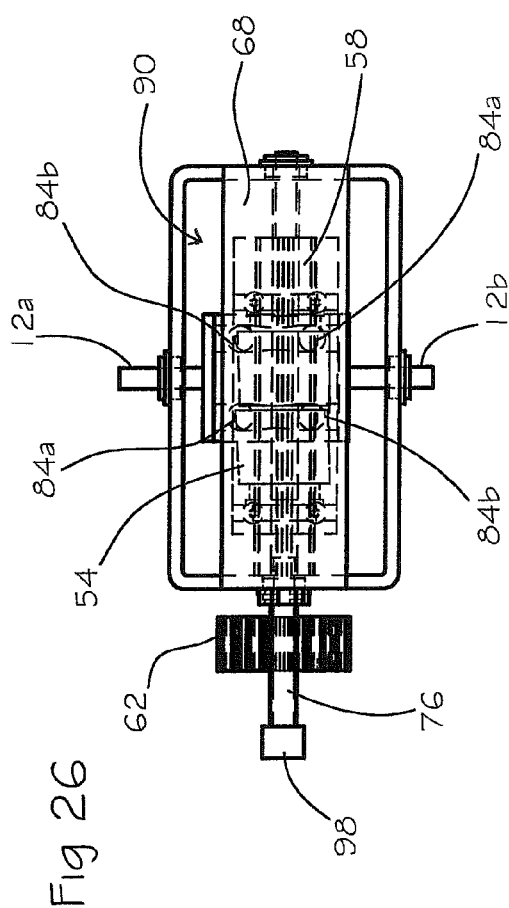
FIG. 26 is a diagrammatic bottom view of the cam mechanism of FIGS. 19 through 21.

FIGS. 21 and 22 are cut away views of the complete 3D conjugate cam mechanism 90. The 84a and 84b bearings are shown positional to the cam assembly 50 when part of frame 68 and follower 82 is partially removed. FIGS. 23, 24, 25, 26 and 27 are all views of the cam mechanism assembly 90.

The relationships and criteria as described in FIGS. 8 to 15 apply to the "3D" cam mechanism 90. The two bearing pairs of 84a and 84b will have the same congruent radii relationship of 26a to 26b and 26c to 26d. Each pair has one spherical roller 84a and one spherical roller 84b. Each is equally divided across the cam shaft 58 with one bearing on each 3D cam. These paired bearings, have their centers in a longitude plane that is in a transverse relationship to the two planes 100. Each roller pair 84a and 84b is in a longitudinally plane with a perpendicular and congruent relationship to the Y axis plane. Each cam will have two mated rollers 84a and rollers 84b at constant tangents 44. There will be one pair of 84a and 84b spherical centers in one plane 100 on cam 52 and the same on the other plane 100 on cam 54 as shown in FIG. 19. The relationship of the center of the bearings 84a and 84b will have the same congruent relationship of 24a to 24b and 24c to 24d. The radii of the bearings through the tangents 44 on the cam profiles 53 through to the intersection of axis 36 of the cam shaft 58 remain osculated. As per FIG. 5 the dimension lengths for all of A to A, B to B and C to C are congruent within the follower holder 10 is the same relationship in the follower holder 82. The theoretical circle 34 of FIGS. 8 to 15 not shown is still projected from the end view through the four tangents 44.

The operation of the second embodiment is the same as the first with a significant additional feature. It has the ability to change its prescribed rectilinear reciprocating motion during its normal operation. This change to its prescribed rectilinear motion being applied to its cam follower assembly 88 is accomplished by laterally moving the 3D cam assembly 50 with in cam frame 68. The cam shaft 58 with drive gear 62 is held rigidly, but allowed to rotate freely. A motor or other driver not shown is connected to cam shaft gear 62 by other gears not shown. The rotation of the gear 62 rotates the cam shaft 58. This in turn rotates the cam assembly 50. This is due to the interlocking of the splines 59 and 57 that cause a positive interaction of 50 and 58. The follower assembly 88 that is encapsulating the cam assembly 50 has continuous positive contact with cams 52 and 54 at their surface profiles 53. This cam contact is at the four tangential points 44 of its spherical bearings two 84a and two 84b. The applied rotation of the drive shaft 58 is in turn directly applied to its interlocking 3D cam assembly 50. This will impart a prescribed reciprocating motion to its mated cam follower assembly 88 including the cam follower holder 82. This reciprocating motion of cam follower holder 82 is applied to its 12a and 12b cam follower connecting shafts. The connecting shafts in turn are connected to a driven body or bodies not shown. The connection to the driven body or bodies is with some form of coupling not detailed. The driven body or bodies will have the prescribed reciprocating motion.

As cam assembly mechanism 92 rotates the invention has the ability to change its created reciprocating motion. This change in motion can be for its type of reciprocating motion and/or its stroke length. This change is then applied to the follower assembly 88 and in turn to the driven body or bodies. The invention as described above has four cam tangents 44. FIG. 19 is of two pair of bearings 84a and 84b that are on opposing sides of the cams 52 and 54. There is also a pair in each of the two planes 100. FIG. 20 when a force is applied to the stroke adjustor shaft 76 at coupling 98 the entire stroke adjustor assembly 94 is moved laterally including the captive cam assembly 50. The lateral motion of shaft 76 is transferred to stroke adjuster frame 70. The 74 arms of 70 apply a force to 48 thrust washer of cam assembly 50. The cam follower assembly 88 is rigid so it cannot move laterally it can only reciprocate. This is due to cam follower shafts 12a and 12b being constrained by the linear bearings 64 within the cam assembly frame 68. The two pairs of cam follower bearings 84a and 84b are positional rigid due to their integration within the follower holder 82. That results in the tangent planes 100 being fixed within the cam mechanism assembly 90. When the cam assembly 50 is moved laterally the 100 planes remain fixed. That results in new tangent points 44 to the cam surfaces 53 of cams 52 and 54. The prescribed cam profiles 53 for the two cams 52 and 54 will apply the changed stroke motion at the tangents 44 at the two 100 planes. This lateral motion of cam assembly 50 can be accomplished at the same time as it rotates. The new cam profiles 53 of cams 52 and 54 will impart a different reciprocating motion on the cam follower assembly 88 and on to the driven body or bodies. FIG. 1 through 27 is an example of substantially uniform reciprocating motion from uniform rotary motion. The percentage of lateral motion change of the stroke adjustor for these examples will equally proportionally change the stroke length percentage imparted by the cam profiles 53 to the cam follower assembly 88. This is accomplished uniquely with a smooth response. Other forms of continuous positive reciprocating motion can be created.

A number of embodiments of the present invention have been described. Nevertheless, it will be understood that various modifications may be made without departing from the spirit and scope of the invention. Accordingly, other embodiments are within the scope of the following claims.

What is claimed is:

1. A cam mechanism for converting rotary motion into a constant velocity reciprocating motion, the cam mechanism comprising:
    a driven shaft rotatable about an axis of rotation;
    first and second cam members mounted to said driven shaft for conjoined rotation therewith, each of said first and second cam members having a surface profile;
    a first pair of followers in contact with said first cam member on the surface profile thereof and on opposite sides thereof;
    a second pair of followers in contact with said second cam member on the surface profile thereof and on opposite sides thereof;
    a follower frame, said first pair of followers and said second pair of followers mounted to said follower frame for conjoint motion therewith; and
    wherein said first cam member and said second cam member each have a non-cardioid shape cam profile that results in a constant velocity linear reciprocation motion of said follower frame upon rotation of said driven shaft about said axis of rotation.

2. The mechanism of claim 1, wherein the cam profile of said first cam member and the profile of said second cam member are congruent and wherein said cam profile of said first cam member and said cam profile of said second cam member are 180-degrees out of phase about said driven shaft.

3. The cam mechanism of claim 2, wherein each follower of said first pair of followers and said second pair of followers is a roller follower.

4. The cam mechanism of claim 1, wherein said first cam member and said second cam member are each a plate cam.

5. The cam mechanism of claim 1, wherein said follower frame encircles said first cam member and said second cam member.

6. The cam mechanism of claim 1, wherein:
said first cam member and said second cam member are each a three-dimensional cam; and
each of said first pair of followers and said second pair of followers are spherical followers.

7. The cam mechanism of claim 6, wherein said first pair of followers and said second pair of followers are longitudinally positional across the cam profile of said first cam member and across the cam profile of said second cam member, respectively, and wherein the longitudinal position of said first pair of followers and said second pair of followers relative to the cam profile of said first cam member and the cam profile of said second cam member, respectively, varies a stroke length of said follower frame between a minimum stroke length and a maximum stroke length.

8. The cam mechanism of claim 6, wherein each of said first pair of followers and said second pair of followers are held captive by said follower frame.

9. The cam mechanism of claim 6, wherein said first cam member and said second cam member are mounted to said driven shaft for reciprocation along said driven shaft.

10. The cam mechanism of claim 9, wherein said first cam member and said second cam member are conjoined together forming a single unit.

* * * * *